United States Patent [19]
Hamai et al.

[11] Patent Number: 5,638,227
[45] Date of Patent: Jun. 10, 1997

[54] DIGITAL DATA RECORDING AND REPRODUCING APPARATUS

[75] Inventors: Shinji Hamai, Osaka; Chiyoko Matsumi, Suita; Akira Iketani, Higashiosaka, all of Japan

[73] Assignee: Matsushita Electric Industrial Co., Ltd., Osaka, Japan

[21] Appl. No.: 356,907

[22] Filed: Dec. 15, 1994

[30]  Foreign Application Priority Data

Dec. 17, 1993 [JP] Japan .................................. 5-318031
Dec. 20, 1993 [JP] Japan .................................. 5-319659

[51] Int. Cl.$^6$ ................................................. G11B 5/09
[52] U.S. Cl. ................................................. 360/48; 360/53
[58] Field of Search ..................... 360/48, 53; 369/53, 369/59; 358/335

[56]  References Cited

U.S. PATENT DOCUMENTS 5,008,764  4/1991  Yoshida et al. ............... 360/73.05 X

FOREIGN PATENT DOCUMENTS 0267029  5/1988  European Pat. Off. .
0498501  8/1992  European Pat. Off. .
0551973  7/1993  European Pat. Off. .
WO9310534  5/1993  WIPO .

OTHER PUBLICATIONS

"Designing a Data Storage Format for Digital Audio Tape (DAT)", Odaka et al., Aug. 25, 1988, pp. 1–22, A1–B6, C1–C3.

*Primary Examiner*—W. C. Kim
*Attorney, Agent, or Firm*—Wenderoth, Lind & Ponack

[57]  ABSTRACT

Input digital data are formatted into a data block composed of a predetermined amount of data, subjected to error correction encoding process, and recorded on a predetermined number of continuous tracks of a recording medium. In the error correction encoding process, the data block is subjected to an inter-track error correction encoding, an outer error correction encoding and an inner error correction encoding. In the inter-track error correction encoding, each information element to be coded is produced by symbols collected from the data which are to be recorded on different tracks of the continuous tracks. The error correction encoded data in the data block are distributed to a first predetermined recording area of each track of the continuous tracks, and parity code words produced by the inter-track error correction encoding are distributed to a second predetermined recording area of each track of the continuous tracks.

10 Claims, 7 Drawing Sheets

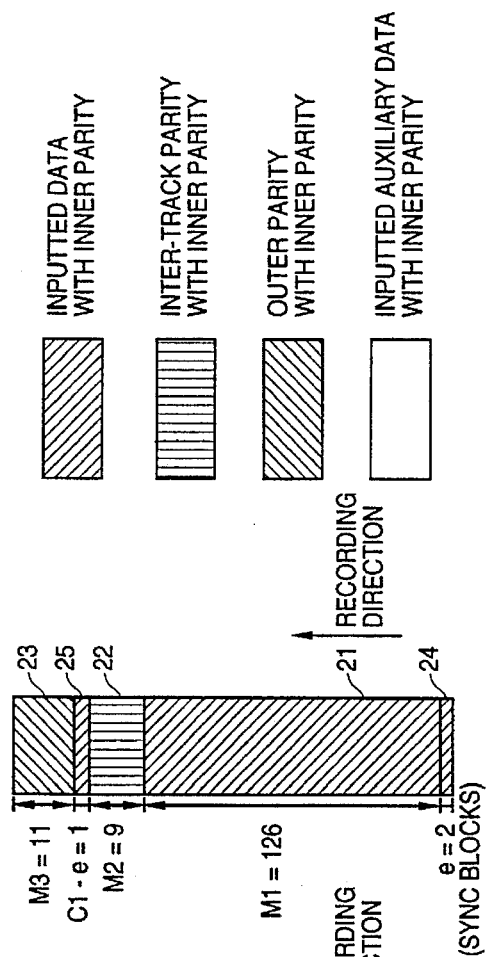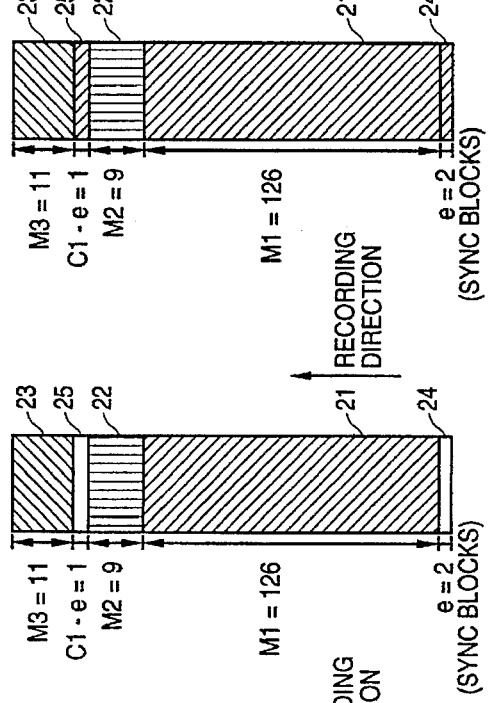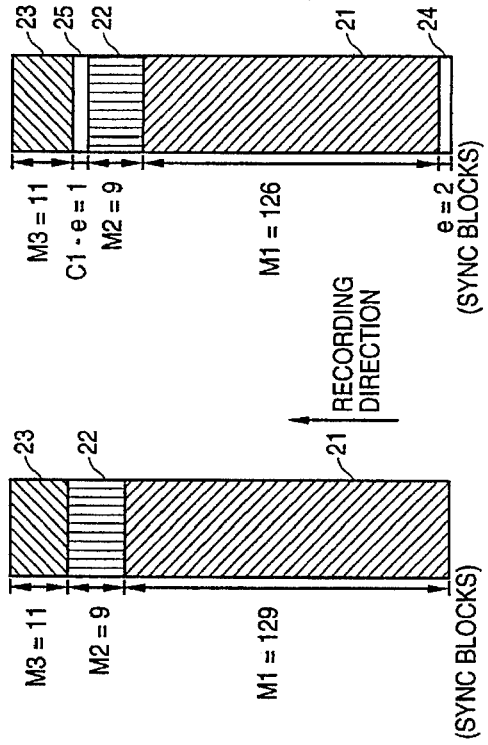

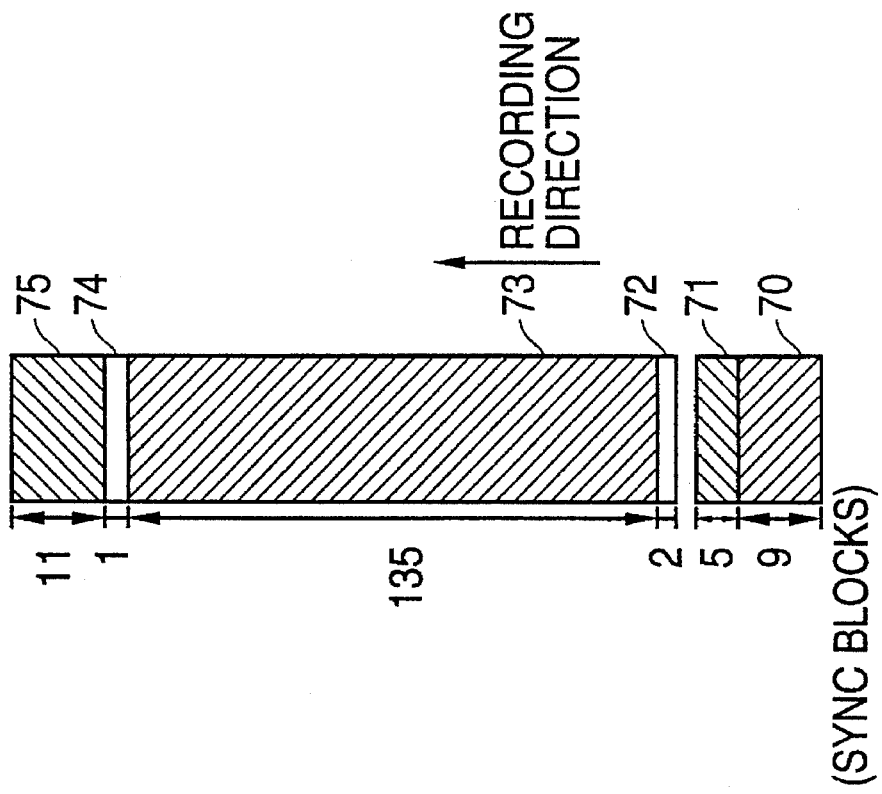
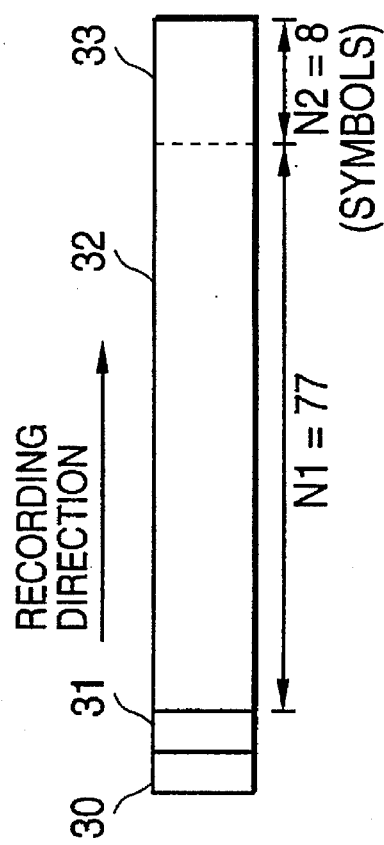

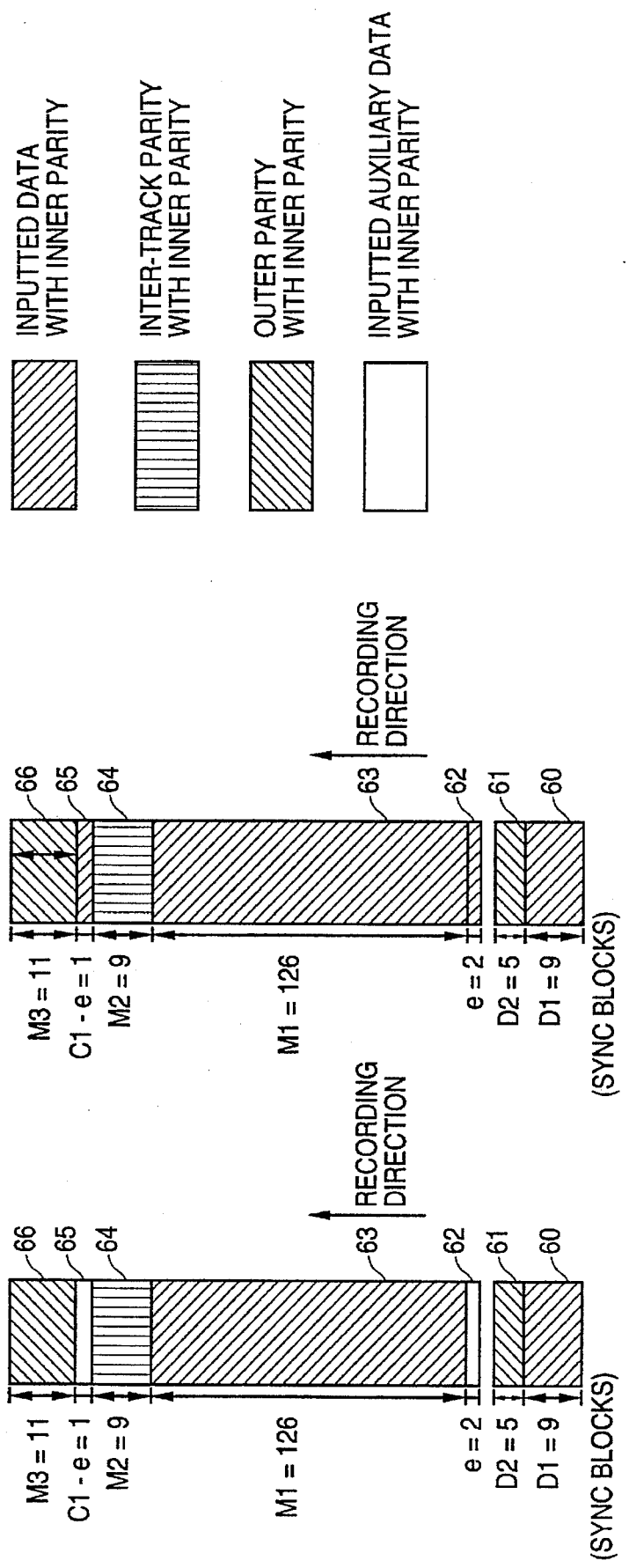

DIGITAL DATA RECORDING AND REPRODUCING APPARATUS

BACKGROUND OF THE INVENTION

1. Field of the Invention

The present invention relates to a recording and reproducing apparatus for recording and reproducing digital data.

2. Description of the Prior Art

A digital VCR (video cassette recorder) for digitizing and compressing pictures and sounds, and recording helically in a magnetic tape is already put in practical use at the present. In the digital VCR, track error correction is done by double error correction in a track. To record digital data by using the digital VCR, it is necessary to keep a sufficiently low error rate. In pictures, an error can be concealed, the error will not propagate, but in computer data, by contrast, errors are not allowable in most cases. Besides, in recording of video signals compressed in a technique for causing error propagations widely, it is required to keep a low error rate. In the existing recording apparatus, however, an error rate is too high for recording computer data or video signals causing error propagations. Another problem was that the correction capacity for burst error for correcting error in the track was low.

Other apparatus is known to record digital data by using DAT (digital audio tape) which is audio recording apparatus for consumer use such as DDS. In this apparatus, in addition to the double error correction in the track, error correction coding is also carried out between tracks. A codeword for inter-track error correction coding used in DDS is composed of a symbol of a same address among plural tracks. Generally, the code of high error correction capacity has a long codeword length, and by employing this method, its correction unit becomes longer along with the correction capacity. In a case of recording and reproducing apparatus using the digital VCR, the capacity per track is large, and to increase the correction unit, capacity of a memory of correction circuit or the like must be increased, and such increase of circuit scale causes a problem.

In the digital VCR, data to be recorded comprises video data, audio data, and auxiliary data for controlling the video data and the audio data. These data are recorded on a magnetic tape by the double error correction coding, and in this case since the auxiliary data records the information about the recorded data, it is desired to record the auxiliary data in the same position as the digital VCR also in the digital data recording and reproducing apparatus.

Furthermore, there is a track for recording only parity. At this time, data of trick play or the like cannot be continuously disposed at a specific position on the track.

A track composition in a conventional digital VCR is shown in FIG. 10. In the conventional digital VCR, the video data are processed by inner error correction coding, and recorded in a video data region 73, a video outer parity generated by outer error correction coding of the video data and the auxiliary data is recorded in a video outer parity region 75, the audio data are processed by inner error correction coding and recorded in an audio data region 70, an audio outer parity generated by outer error correction of the audio data is recorded in an audio outer parity region 71, and the auxiliary data is recorded in a first auxiliary data region 72 and a second auxiliary data region 74.

SUMMARY OF THE INVENTION

It is hence a primary object of the invention to present a digital data recording and reproducing apparatus which is small in circuit scale and high in error correction capacity, and which can record a parity generated by inter-track error correction coding between tracks at a determined position of track so that the data can be recorded in a determined position in the track on a magnetic tape.

To obtain the primary object, a recording part of the digital data recording and reproducing apparatus of the invention for recording input data composed of a sequence of data words each being composed of a plurality of symbols onto a plurality of continuous tracks on a recording medium, comprising: a data formatting means for forming from the sequence of data words of the input data a data block which is composed of a plurality of data groups each being composed of a plurality of data words; a first error correction coding means for performing an inter-track error correction coding by forming a plurality of first information elements each being composed of a plurality of symbols collected from a plurality of data words selected from different data groups among said plurality of data groups and subjecting each of the first information elements to an error correction encoding to obtain a plurality of first parity code words for the plurality of first information elements; a second error correction coding means for performing an outer error correction coding for each of the plurality of data groups by forming a plurality of second information elements each being composed of a plurality of symbols collected from the plurality of data words and the plurality of first parity code words in each of the plurality of data word units and subjecting the plurality of second information elements to an error correction coding to obtain a plurality of second parity code words; a third error correction coding means for performing an inner error correction coding by subjecting each of the plurality of data words in the data block, each of the plurality of first parity code words and each of the plurality of second parity code words to an error correction coding to obtain a plurality of third parity code words; and recording means for adding a sync pattern and a sync block number to each of the data words, the first parity code words and the second parity code words with the associated third parity code words to form data sync blocks corresponding to the data words, first parity sync blocks corresponding to the first parity code words and second parity sync blocks corresponding to the second parity code words, and for recording the data word sync blocks, first parity sync blocks and second parity sync blocks derived from the data block on a predetermined number of continuous tracks on the recording medium such that the data word sync blocks in each data word unit of the plurality of data word units are recorded in a first predetermined recording area of a corresponding one track of the predetermined number of continuous tracks and that the first parity sync blocks are distributed to a second predetermined recording area of each of the predetermined number of continuous tracks.

Further, to obtain the primary object, a reproducing part of the digital data recording and reproducing apparatus of the invention for recording input data composed of a sequence of data words each being composed of a plurality of symbols onto a plurality of continuous tracks on a recording medium and for reproducing the recorded data from the recording medium, comprising: reproducing means for reproducing from the recording medium the recorded data words and first through third parity code words of each data block; a second rotary for recording therein the reproduced data words and first through third parity code words; a first error correction decoding means for error correction decoding each the data words and the first and second parity code words stored in the second memory by using the third parity code words stored in the second memory and for storing the the decoded data words and the decoded first and second parity code words into the second memory; a second error correction decoding means for error correction decoding the data words and the first parity code words stored in the second memory by using the second parity code words stored in the memory and for storing the decoded data words and the decoded first parity code words into the second memory; a third error correction decoding means for error correction decoding the data words stored in the second memory by using the first parity code words stored in the second memory to obtain a decoded data block composed of finally decoded data words; and deformatting means for deformatting the decoded data block into a sequence of decoded data words.

In a preferred embodiment, a digital data recording and reproducing apparatus of the invention for recording input data composed of a sequence of data words each being composed of a plurality of symbols onto a plurality of continuous tracks on a recording medium and for reproducing the recorded data from the recording medium, comprising: a data formatting means for forming from the sequence of data words of the input data a first data block which is composed of a first plurality of data words and a second data block which is composed of a second plurality of data words; a first memory for storing therein all the data words in the first and second data blocks; a first error correction coding means for performing a first error correction coding for the data words in the first data block stored in the first memory to obtain a plurality of first parity code words and for storing the plurality of first parity code words into the first memory; a second error correction coding means for performing a second error correction coding for the data words in the first and second data blocks and the first parity code words stored in the first memory to obtain a plurality of second parity code words and for storing the plurality of second parity code words into the first memory; a third error correction coding means for performing a third error correction coding for each of the data words in the first and second data blocks, the first parity code words and the second parity code words stored in the first memory to obtain a plurality of third parity code words and for outputting the data words in the first and second data blocks and the first through third parity code words; recording means for recording the data words and the first through third parity code words outputted from the third error correction coding means on a predetermined number of continuous tracks on the recording medium such that the data words in the first and second data blocks are distributed to a first predetermined recording area of each track of the predetermined number of continuous tracks and that the first parity code words are distributed to a second predetermined recording area of each track of the predetermined number of continuous tracks; reproducing means for reproducing from the recording medium the recorded data words and first through third parity code words; a second memory for recording therein the reproduced data words and first through third parity code words; a first error correction decoding means for error correction decoding each the data words in the first and second data blocks and the first and second parity code words stored in the second memory by using the third parity code words stored in the second memory and for storing the the decoded data words and the decoded first and second parity code words into the second memory; a second error correction decoding means for error correction decoding the data words in the first and second data blocks and the first parity code words stored in the second memory by using the second parity code words stored in the memory and for storing the decoded data words and the decoded first parity code words into the second memory; a third error correction decoding means for error correction decoding the data words in the first data block stored in the second memory by using the first parity code words stored in the second memory to obtain a decoded first data block and a decoded second data block; and deformatting means for deformatting the decoded first and second data blocks into a sequence of decoded data words.

Accordingly, a digital data recording and reproducing apparatus which is small in circuit scale and high in error correction capacity is produced.

BRIEF DESCRIPTION OF THE DRAWINGS

FIG. 6($a$) is a configuration of track in the second embodiment of the invention.

FIG. 6($b$) is a configuration of other track in the second embodiment of the invention.

FIG. 6($c$) is a configuration of another track in the second embodiment of the invention.

FIG. 7 is a configuration of the sync block in the first and second embodiments of the invention.

FIG. 9($a$) is a configuration of a track in the third embodiment of the invention.

FIG. 9($b$) is a configuration of other track in the third embodiment of the invention.

FIG. 10 is a configuration of a conventional track.

DESCRIPTION OF THE PREFERRED EMBODIMENTS

Figure 1:
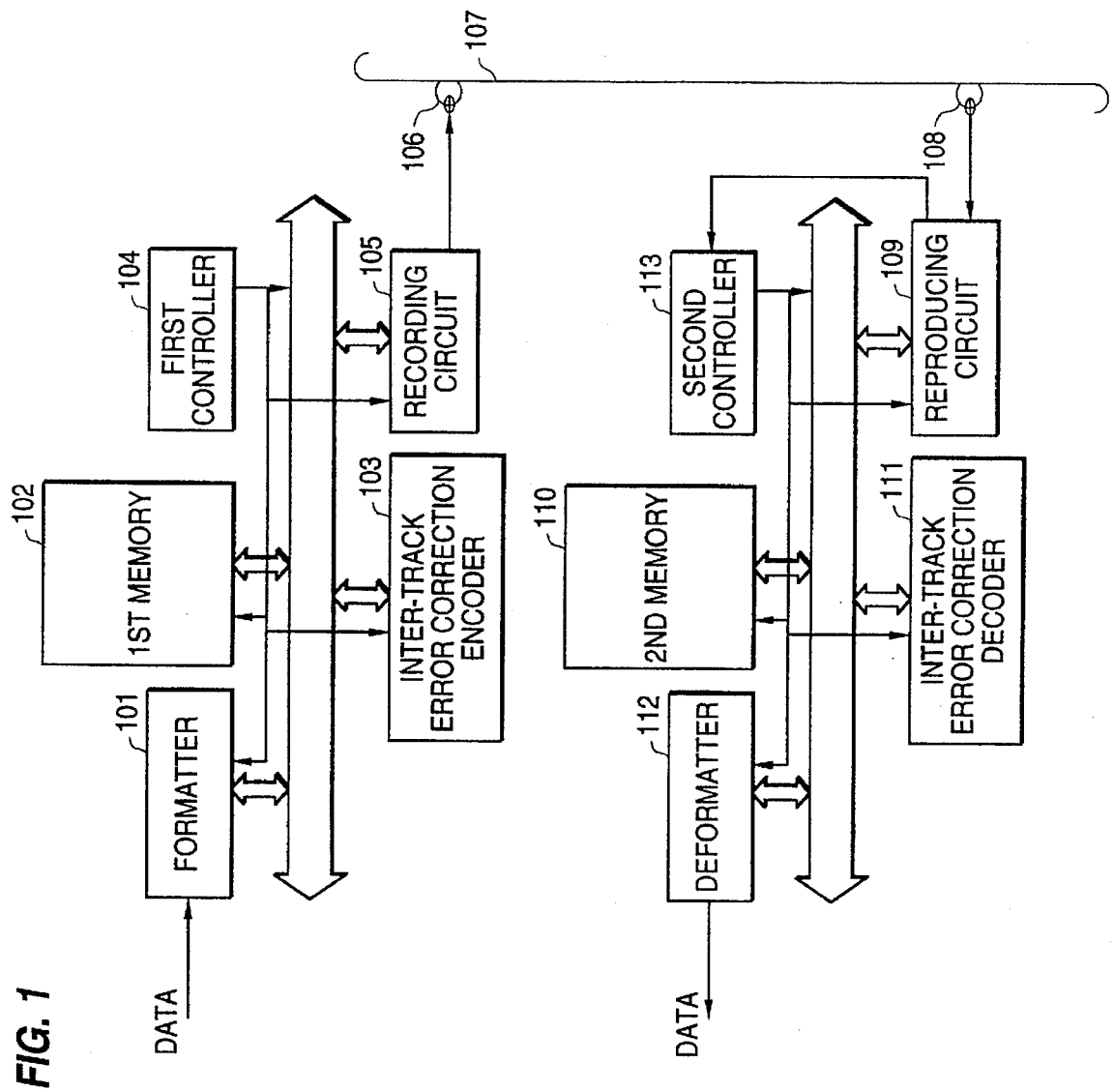
FIG. 1 is a block diagram of a digital data recording and reproducing apparatus in a first embodiment of the invention.

FIG. 1 is a block diagram of a digital data recording and reproducing apparatus in a first embodiment of the invention. When recording, input data is fed into a formatter 101. The formatter 101 writes input data into a first memory 102 in every M1×N1×L symbols (M1, N1, L are natural numbers). At this time, a first controller 104 controls the formatter 101 and first memory 102 so that the input data may be written in a specific address in the first memory 102.

An inter-track error correction encoder 103 reads out the input data of M1 symbols from the first memory 102, and performs inter-track error correction by using an M1+M2 code and an M1 code, and generates a parity of M2 symbols and writes into the first memory 102. This operation is repeated N1×L times, and all input data stored in the first memory 102 are coded by inter-track error correction. At this time, the first controller 104 controls the inter-track correction encoder 103 and first memory 102 so that the inter-track error correction encoder 103 may perform inter-track error correction coding in specified sequence to write the parity into the first memory 102.

A recording circuit 105 reads out the input data and generated parities in specified sequence, and performs outer error correction coding and inner error correction coding, forms sync blocks, modulates, and sends the modulated signals into a recording head 106. At this time, the first controller 104 controls the recording circuit 105 and first memory 102 so as to record the data in specified sequence.

A recording head 106 records the modulated signal into a magnetic tape 107.

At this time, the inter-track error correction encoder 103 generates a parity symbol of M2 symbols corresponding to the input data of M1 symbols. For input data of M1×N1×L symbols, parities of M2×N1×L symbols are generated. The recording circuit 105 processes input data and parity of (M1+M2)×N1×L symbols by outer error correction coding and inner error correction coding, and divides into sync blocks and records into L tracks. By composing so that the information element and parity element of one codeword of the inter-track error correction encoder may be dispersed in L tracks, the codeword is composed so that the information element and parity element of one codeword may be apart from each other as far as possible on the magnetic tape.

Figure 2:
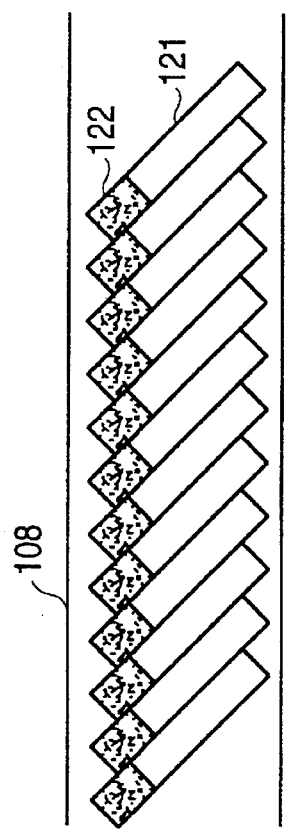
FIG. 2 is a configuration of track of magnetic tape in the first embodiment of the invention.

The track configuration on the magnetic tape 108 is shown in FIG. 2. The track consists of a data region 121 and a parity region 122. In the data region 121 of each track, the input data is recorded, and in the parity region 122, the parity generated in the inter-track error correction encoder 103 is recorded.

Figure 3:
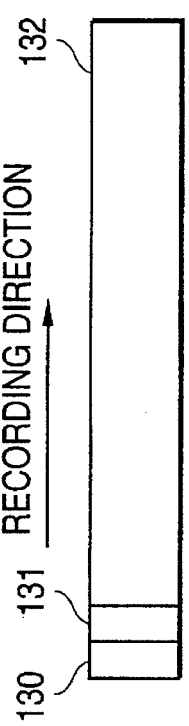
FIG. 3 is a configuration of sync block in the first embodiment of the invention.

In the recording circuit 105, the data is composed in sync blocks. A sync block configuration is shown in FIG. 3. The data to be recorded is divided into a block 132, and a sync pattern 130 and an ID 131 are added before the block 132. The sync pattern is a fixed bit pattern, and is used for identifying the sync block when reproducing. The ID comprises track number and sync block number, and is used for identifying the reproduced data when reproducing.

In each track, at lest M1+M2 sync blocks are recorded. First M1 sync blocks using input data as blocks are recorded, when M2 sync blocks using parities as blocks are recorded.

Figure 4:
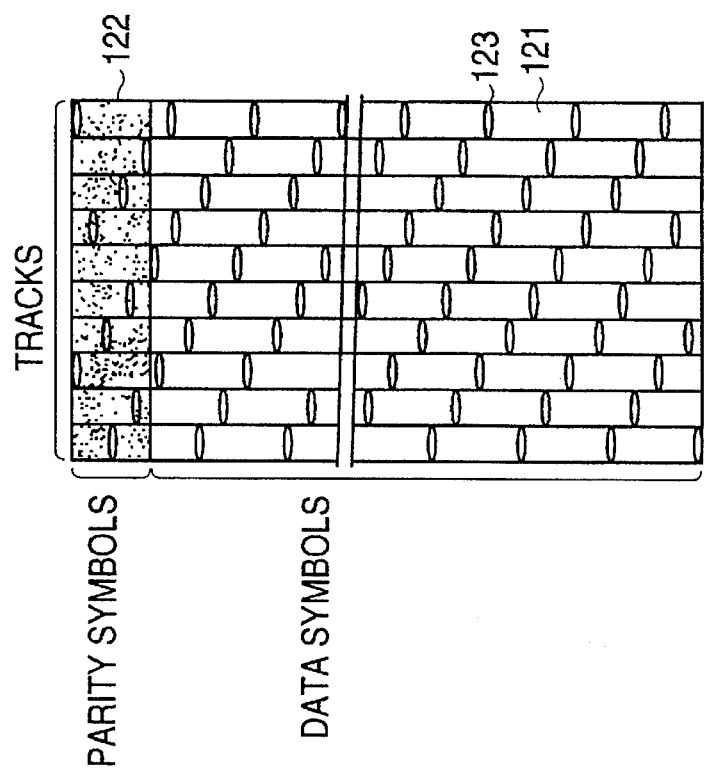
FIG. 4 is a configuration of track in the first embodiment of the invention.

An example of composition of codeword of inter-track error correction coding is shown in FIG. 4. Symbol 123 is a symbol of one codeword of inter-track error coding. As shown in FIG. 4, symbols of one codeword are dispersed among tracks, and are recorded so that their positions on the magnetic tape may be as far from each other as possible. Sync blocks to be recorded in tracks are numbered. Herein, a same number is given to sync blocks to be recorded in a same position in different tracks. Elements of codeword of inter-track error coding are recorded by dispersing in sync blocks of all different numbers.

When numbering the symbols of blocks of sync blocks, elements of codeword of inter-track error correction coding are recorded by dispersing into symbols of blocks of different numbers as far as possible.

Herein, the outer error correction coding and inner error correction coding are same as used in the conventional digital VCR.

When reproducing, a reproducing head 108 reproduces a signal from the magnetic tape 107, and sends out to a reproducing circuit 109. The reproducing circuit 109 demodulates the reproduced signal, and performs inner error correction coding and outer error correction coding, and sends out data to a second memory 110. At this time, the reproducing circuit 109 recomposes the data into blocks according the sync pattern of the reproduced data. The ID is sent out into the second controller 113. When sending the reproduced data out into the second memory 110, the second controller 113 determines the address for recording the data of the second memory 110 on the basis of the input ID, and controls the second memory 110 and reproducing circuit 109 so that the data may be stored in the determined address.

An inter-track error correction decoder 111 reads out data from the second memory 110, and processes the read data by inter-track error correction decoding, and writes the corrected data into the second memory 110. At this time, the second controller 113 determines the codeword for inter-track error correction coding according to the composition of the codeword at the time of recording, and controls the inter-track error correction decoder 111 and second memory 110 so that the inter-track error decoder 111 may read out or write in the data.

Consequently, a deformatter 112 reshuffles the data after inter-track error correction decoding in the specified sequence, and sends out. The decoded data is stored in the second memory 110. The second controller 113 controls the second memory 110 and deformatter 112 so that the data after inter-track error correction may be reshuffled and put out.

By thus recording and reproducing data in magnetic tape, data is coded by triple error correction, and data can be recorded at low error rate. At the same time, the parities generated by inter-track error correction coding can be recorded by dispersing in all tracks.

Figure 5:
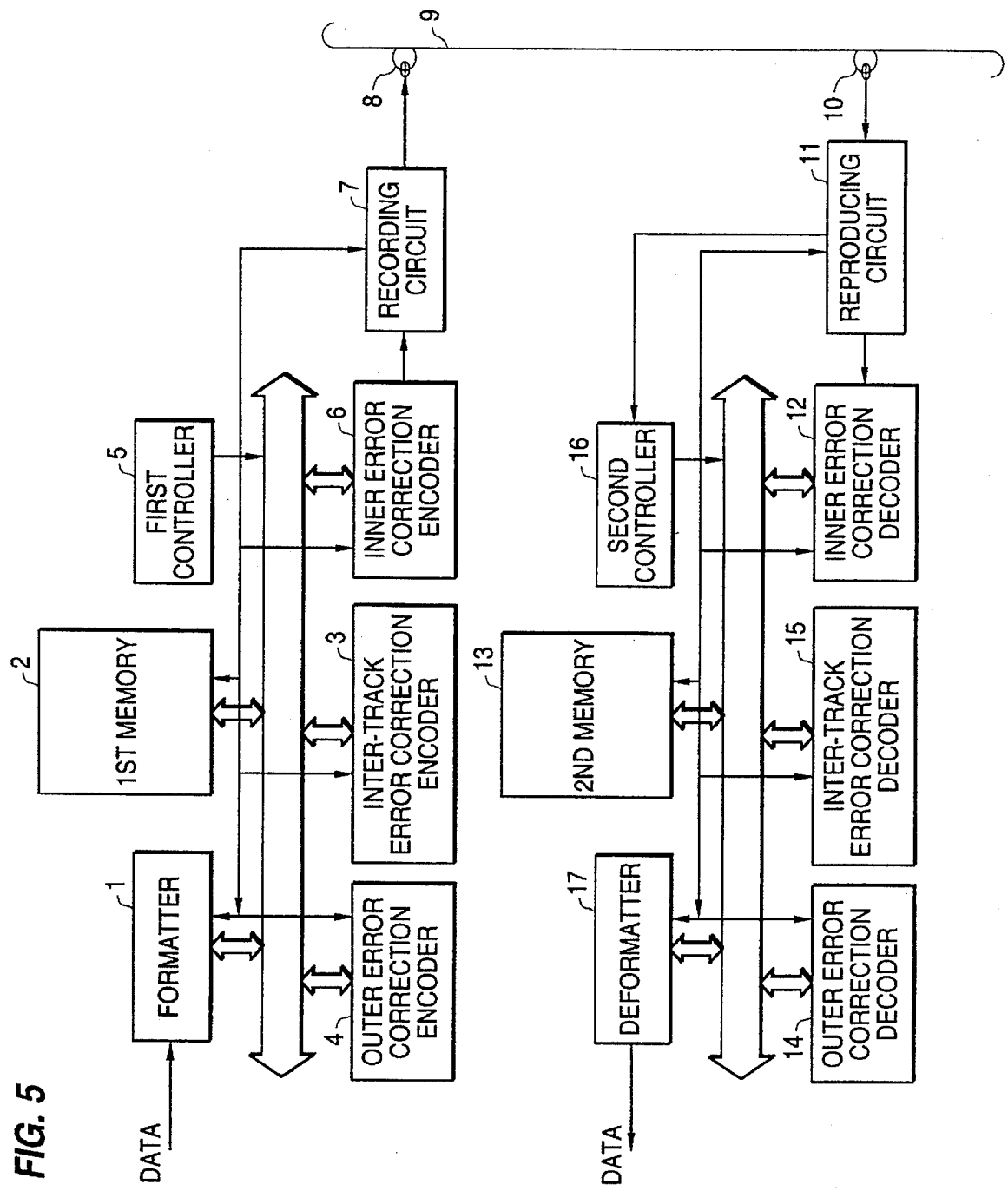
FIG. 5 is a block diagram of a digital data recording and reproducing apparatus in a second embodiment of the invention.

FIG. 5 is a block diagram of a second embodiment of the digital data recording and repreducing apparatus of the invention.

The data to be recorded is put in a formatter 1. In the formatter 1, the input data is divided into data blocks of every M1×N1×L (M1, N1, L are natural numbers) symbols, and fed into a first memory 2. Herein, L is the number of tracks of magnetic tape for recording data blocks.

After the data block in the size of M1×N1×L is put into the formatter 1, a first controller 5 generates addresses of the first memory 2 so as to deliver the data of data block from the first memory 2 into an inter-track error correction encoder 3 in every M1 symbols. The inter-track error correction encoder 3, using the input M1 symbols as information elements, performs inter-track error correction for generating parities between tracks in the size of M2 (M2 is a natural number) symbols, and sends out the generated parities between tracks in the size of M2 symbols into the first memory 2. This operation is repeated N1×L times. The inter-track error correction encoder 3 composes N1×L codewords from one data block, and generates parity elements of M2×N1×L symbols, and sends out to the first memory 2.

After inter-track error correction coding, the first controller 5 generates the address of the first memory 2 so as to deliver the data block and inter-track parity from the first memory 2 into an outer error correction encoder 4 in every M1+M2 symbols. The outer error correction encoder 4, using the input M1+M2 symbols as information elements, performs outer error correction coding for generating outer parity in the size of M3 (M3 is a natural number) symbols, and sends out the generated enter parity in the size of M3 symbols into the first memory 2. This is repeated N1×L times. The outer error correction encoder 4 composes N1×L codewords from data of (M1+M2)×N1×L symbols, and generates parities of M3×N1×L symbols, and sends out to the first memory 2.

After outer error correction coding, the first controller 5 generates the address of the first memory 2 so as to deliver the data block, inter-track parity, and outer parity from the first memory 2 into an inner error correction encoder 6 in every N1 symbols. The inner error correction encoder 6, using the input N1 symbols as information elements, performs inner error correction coding for generating inner parity in the size of N2 (N2 is a natural number) symbols, and sends out the generated inner parity in the size of N2 symbols sequentially into a recording circuit 7. This is repeated (M1+M2+M3)×L times. The inner error correction encoder 6 composes (M1+M2+M3)×L codewords from data in the size of (M1+M2+M3)×N1×L symbols, and generates parities of (M1+M2+M3)×N2×L symbols, and sends out to the recorder 7.

Herein is described the codeword composition of inter-track error correction coding, outer error correction coding, and inner error correction coding. Data blocks in the size of M1×N1×L symbols divided by the formatter 1 are supposed to be A(b), b=0, 1, ..., M1×N1×L−1 in the input sequence. The first memory 2 at least possesses an address space of (M1+M2+M3)×N1×L, and the addresses are expressed as p, q, r, and the data stored in the addresses p, q, r are supposed to be E1(p, q, r). Suppose p=0, 1, ..., L−1, q=0, 1, ..., M1+M2+M3−1, and r=0, 1, ..., N1−1.

The relation between the number b of the input data A(b) and the addresses p, q, r of the data E1(p, q, r) stored in the first memory 2 is shown in formula (1).

$$p=\lfloor b/(M1 \times N1) \rfloor$$

$$q=b \bmod (M1 \times N1)$$

$$r=b \bmod N1 \quad (1)$$

where $$p=0, 1, \ldots, L-1$$

$$q=0, 1, \ldots, M1-1$$

$$r=0, 1, \ldots, N1-1$$

$$b=0, 1, \ldots, M1 \times N1 \times L-1$$

Incidentally, $\lfloor c \rfloor$ is a maximum positive integer not excluding c, and mod c is a remainder of c. That is, the input data A(b) is stored in the address shown in formula (1) of the first memory 2. At this time, the first controller 5 generates addresses p, q, r of the first memory 2 according to the number b of the input data and formula (1). The data stored in the first memory 2 for inter-track error correction coding is sent out to the inter-track error correction encoder 3. There are N1×L codewords of inter-track error correction coding, and the information element of one codeword is composed of M1 symbols. Suppose the codeword of inter-track error correction coding to be F1(s1), s1=0, 1, ..., N1×L−1. Also suppose the information element of codeword of F1(s1) to be G1(s1, t1), t1=0.1, ..., M1−1. The relation between the addresses s1, t1 of the information element G1 (s1, t1) of the codeword of F1(s1) and addresses p, q, r of data E1 (p, q, r) stored in the memory is expressed in formula (2).

$$p=(s1/N1)+(t1 \times d) \bmod L$$

$$q=t1$$

$$r=(t1+s1) \bmod N1 \quad (2)$$

where $$p=0, 1, \ldots, L-1$$

$$q=0, 1, \ldots, M1-1$$

$$r=0, 1, \ldots, N1-1$$

$$s1=0, 1, \ldots, N1 \times L-1$$

$$t1=0, 1, \ldots, M1-1$$

$$d=3 \text{ (constant)}$$

The first controller 5 generates addresses p, q, r of the first memory so as to deliver the information elements G1 (s1, t1) sequentially and in the code word unit into the inter-track error correction encoder 3. Herein, d is an offset for dispersing the codeword of inter-track error correction coding among tracks. The inter-track error correction encoder 3 encodes the input information element by inter-track error correction, and generates an inter-track parity. The parity elements that are generated by inter-track error correction coding of codeword F1 (s1) are G1p (s1, u1), u1=0, 1, ..., M2−1. At this time, the codeword of inter-track error correction coding is (G1(s1,0), G1(s1,1), ..., G1(s1,t1), ..., G1(s1,M1−2), G1(s1,M1−1), G1p(s1,0), G1p(s1,1), ..., G1p(s1,u1), ..., G1p(s1,M2−2), G1p(s1,M2−1)).

The generated inter-track parity is stored in the first memory 2. At this time, the relation between the addresses s1, u1 of parity element G1p (s1, u1) and addresses p, q, r of the first memory 2 is expressed in formula (3).

$$p=((s1/N1)+((u1+M1) \times d)) \bmod L$$

$$q=u1$$

$$r=(t1+M1+s1) \bmod N1 \quad (3)$$

where $$p=0, 1, \ldots, L-1$$

$$q=M1, M1+1, \ldots, M1+M2-1$$

$$r=0, 1, \ldots, N1-1$$

$$s1=0, 1, \ldots, N1 \times L-1$$

$$u1=0, 1, \ldots, M2-1$$

The controller generates addresses p, q, r of the first memory 2 so as to store the inter-track parity generated in the inter-track error correction encoder 3 in the first memory 2 according to formula (3).

After inter-track error correction coding, the data stored in the first memory 2 for outer correction coding is sent out into an outer error correction encoder 4.

There are N1×L codewords of outer error correction coding, and the information element of one codeword is composed of (M1+M2) symbols. Herein, suppose the codeword of outer error correction coding to be F2(s2), s2=0, 1, ..., N1×L−1. Suppose also the information element of codeword of F2(s2) to be Gs(s2, t2), t2=0, 1, ..., M1+M2−1. The relation between addresses s2, t2 of the information element G2 (s2, t2) of codeword of F2(s2) and addresses p, q, r of data E1(p, q, r) stored in the memory is shown in formula (4).

$$p=\lfloor s2/N1 \rfloor$$

$$q=t2$$

$$r = s2 \bmod N1 \quad (4)$$

where $$p = 0, 1, \ldots, L-1$$
$$q = 0, 1, \ldots, M1+M2-1$$
$$r = 0, 1, \ldots, N1-1$$
$$s2 = 0, 1, \ldots, N1 \times L-1$$
$$t2 = 0, 1, \ldots, M1+M2-1$$

The first controller 5 generates addresses p, q, r of the first memory 2 so as to deliver the information element G2(s2, t2) of codeword F2(s2) sequentially into the outer error correction encoder 4. The outer error correction encoder 4 processes the input information element G2(s2, t2) by outer error correction coding, and generates an outer parity. The parity element generated at the time of outer error correction coding of information element G2(s2, t2) of codeword F2(s2) is supposed to be G2p(s2, u2), u2=0, 1, ..., M3-1. At this time, the codeword is (G2(s2,0), G2(s2,1), ..., G2(s2,t2), ..., G2(s2,M1+M2-2), G2(s2,M1+M2-1), G2p(s2,0), G2p(s2,1), ..., G2p(s2,u2), ..., G2p(s2,M3-2), G2p(s2,M3-1))

The generated parity is stored in the first memory 2. The relation between the parity element G2p(s2, u2) of the outer parity and the addresses p, q, r of the second memory 2 is shown in formula (5).

$$p = \lfloor s2/N1 \rfloor$$
$$q = u2 + M1 + M2$$
$$r = s2 \bmod N1 \quad (5)$$

where $$p = 0, 1, \ldots, L-1$$
$$q = M1+M2, M1+M2+1, \ldots, M1+M2+M3-1$$
$$r = 0, 1, \ldots, N1-1$$
$$s2 = 0, 1, \ldots, N1 \times L-1$$
$$t2 = 0, 1, \ldots, M3-1$$

So as to store the outer parity generated in the outer parity correction encoder 4 may be stored in the first memory 2 according to formula (5), the control circuit generates addresses p, q, r of the first memory 2.

After outer error correction coding, the data stored in the first memory 2 is sent out to an inner error correction encoder 6 for inner error correction coding.

There are (M1+M2+M3)×L codewords for inner error correction coding, and the information elements of one codeword are composed of N1 symbols. Suppose the codeword of inner error correction coding to be F3(s3), s3=0, 1, ..., (M1+M2+M3)×L-1. Also suppose the information element of codeword of F3(s3) to be G3(s3, t3), t3=0, 1, ..., N1-1. The relation between addresses s3, t3 of the information element G3(s3, t3) of codeword of F3(s3) and addresses p, q, r of the data E1 (p, q, r) stored in the memory is expressed in formula (6).

$$p = \lfloor s3/(M1+M2+M3) \rfloor$$
$$q = s3 \bmod (M1+M2+M3)$$
$$r = t3 \quad (6)$$

where $$p = 0, 1, \ldots, L-1$$
$$q = 0, 1, \ldots, M1+M2+M3-1$$
$$r = 0, 1, \ldots, N1-1$$
$$s3 = 0, 1, \ldots, (M1+M2+M3) \times L-1$$
$$t3 = 0, 1, \ldots, N1-1$$

The first controller 5 generates addresses p, q, r of the first memory 2 so as to deliver the information element G3(s3, t3) of codeword F3(s3) into the inner error correction encoder 6 in the sequence of s3=0, 1, ..., (M1+M2+M3)×L)-1. The inner error correction encoder 6 processes the input codeword F3(s3) by error correction coding, and generates an inner parity. The parity element generated at the time of inner error correction coding of the codeword F3(s3) is supposed to be G3p(s3, u3), u3=0, 1, ..., N2-1. At this time, the codeword is (G3(s3,0), G3(s3,1), ..., G3(s3,t3), ..., G3(s3,N1-2), G3(s3,N1-1), G3p(s3,0), G3p(s3,1), ..., G3p(s3,u3), ..., G3p(s3,N2-2), G3p(s3,N2-1))

and the inner error correction encoder 6 sends out the input information element of one codeword and parity element into a recording circuit 7 in the sequence of codewords.

In the recording circuit 7, the input data is provided with a sync pattern which is a mark for reproducing and an ID which is a position address on the track, in the codeword unit of inner error correction coding to obtain a sync block, which is modulated and sent out into a recording head 8. The recording head records the modulated signal into a magnetic tape 9. At this time, the recording circuit 7 gathers M1+M2+M3 sync blocks composed of codeword F3(s3) for inner error correction coding, and modulates in batch as one track. The ID is composed of at least the track number to be recorded and the sync block number in the track.

When reproducing, a reproducing head 10 reproduces data from the magnetic tape 9, and sends it into a reproducing circuit 11. In the reproducing circuit 11, the input reproduced signal is demodulated, and is reshuffled into a sync block according to the sync pattern, and an ID and an inner codeword are obtained, which are put into an inner error correction decoder 12.

The inner error correction decoder 12 processes the reshuffled inner codeword by inner error correction decoding. Elements of the inner codeword are supposed to be J3(y3), y3=0, 1, ..., N1+N2-1, sequentially from the beginning. Herein, elements of J3(y3), y3=0, 1, ..., N1-1 are information elements of inner codeword, and elements of J3(y3), y3=N1, N1+1, ..., N1+N2-1 are parity elements of inner codeword. The inner error correction decoder 12 processes J3(y3) by error correction decoding, and sends out the decoded information elements J3'(y3'), y3'=0, 1, ..., N1-1 into a second memory 13. At this time, the input ID is delivered to a second controller 16.

The second memory 13 possesses at least a capacity in the size of (M1+M2+M3)×N1×L symbols, of which addresses are expressed by p', q', r', and the data expressed by addresses p', q', r' are supposed to be E1'(p', q', r').

The second controller 16 generates addresses of the second memory 13 on the basis of the input ID, and stores the output of the inner error correction decoder 12 into the second memory 13. Supposing the track number contained in the ID to be v, the sync block number in the track to be w, and the output of the inner error correction decoder 12 to be J3'(y3'), y3'=0, 1, ..., N1−1, according to formula (7) below, addresses p', q', r' of the second memory 13 are generated, and the output of the inner error correction decoder 12 is stored in the second memory 13. The relation of the address y3' of the inner error corrected information element J3'(y3'), the ID position addresses v, w, and addresses p', q', r' of the second memory 13 is shown in formula (7).

$$p'=v$$
$$q'=w$$
$$r'=y3' \quad (7)$$

where $$p=0, 1, \ldots, L-1$$
$$q=0, 1, \ldots, M1+M2+M3-1$$
$$r=0, 1, \ldots, N1-1$$
$$v=0, 1, \ldots, L-1$$
$$w=0, 1, \ldots, M1+M2+M3-1$$
$$y3'=0, 1, \ldots, N1-1$$

After storing of inner error corrected information elements for the portion of one data block, that is, L tracks into the second memory 13, for outer error correction decoding, the information elements stored in the second memory 13 are issued to an outer error correction decoder 14.

There are N1×L codewords for outer error correction decoding for data block, and elements of one codeword are composed of (M1+M2+M3) symbols. Herein, codewords for outer error correction decoding are supposed to be H2(x2), x2=0, 1, ..., N1×L−1, and elements of H2(x2) to be J2(x2, y2), y2=0, 1, ..., M1+M2+M3−1. The relation between addresses x2, y2 of element J2(x2, y2), and addresses p', q', r' of data E1'(p', q', r') stored in the second memory 13 is shown in formula (8).

$$p'=\lfloor x2/N1 \rfloor$$
$$q'=y2$$
$$r'=x2 \bmod N1 \quad (8)$$

where $$p'=0, 1, \ldots, L-1$$
$$q'=0, 1, \ldots, M1+M2+M3-1$$
$$r'=0, 1, \ldots, N1-1$$
$$x2=0, 1, \ldots, N1\times L-1$$
$$y2=0, 1, \ldots, M1+M2+M3-1$$

A second controller 16 generates addresses p', q', r' of the second memory 13 so as to deliver elements J2(x2, y2) of codeword H2(x2) sequentially into the outer error correction decoder 14. Herein, elements of J2(x2, y2), y2=0, 1, ..., M1+M2−1 are information elements of outer codeword, and elements of J2(x2, y2), y2=M1+M2, M1+M2+1, ..., M1+M2+M3−1 are parity elements of outer codeword. The outer error correction decoder 14 delivers the outer error correction decoded information elements J2' (x2', y2'), x2=0, 1, ..., N1×L, y2=0, 1, ..., M1+M2−1 into the second memory 13. The outer error correction decoded information element J2'(x2', y2') is stored in the second memory 13. At this time, the relation between addresses x2', y2' of the information element J2'(x2', y2') and addresses p', q', r' of the second memory 13 is shown in formula (9).

$$p'=\lfloor x2'/N1 \rfloor$$
$$q'=y2'$$
$$r'=x2' \bmod N1 \quad (9)$$

where $$p'=0, 1, \ldots, L-1$$
$$q'=0, 1, \ldots, M1+M2-1$$
$$r'=0, 1, \ldots, N1-1$$
$$x2'=0, 1, \ldots, N1\times L-1$$
$$y2'=0, 1, \ldots, M1+M2-1$$

The second controller 16 generates addresses p', q', r' of the second memory 13 so that the data error correction decoded in the outer error correction decoder 14 may be stored in the second memory 13 according to formula (9).

After storing the outer error correction decoded information element into the second memory 13, for inter-track error correction decoding, the data stored in the second memory 13 is issued into an inter-track error correction decoder 15.

There are N1×L codewords for inter-track error correction decoding per data block, and elements of one codeword are composed of (M1+M2) symbols. Herein, codewords for inter-track error correction decoding are supposed to be H1(x1), x1=0, 1, ..., N1×L−1, and elements of H1(x1) to be J1 (x1, y1), y1=0, 1, ..., M1+M2−1. The relation between addresses x1, y1 of element J1(x1, y1), and addresses p', q', r' of element E1', (p', q', r') stored in the second memory 13 is shown in formula (10).

$$p'=((x1/N1)+(y1\times d)) \bmod L$$
$$q'=y1$$
$$r'=(x1+y1) \bmod N1 \quad (10)$$

where $$p'=0, 1, \ldots, L-1$$
$$q'=0, 1, \ldots, M1+M2-1$$
$$r'=0, 1, \ldots, N1-1$$
$$x1=0, 1, \ldots, N1\times L-1$$
$$y1=0, 1, \ldots, M1+M2-1$$
$$d=3$$

The second controller 16 generates addresses p', q', r' of the second memory 13 so as to deliver the elements J1(x1, y1) of the codeword H1(x1) sequentially into the inter-track error correction decoder 15. Herein, the elements of J1(x1, y1), y1=0, 1, ..., M1−1 are information elements of codeword for inter-track error correction coding, and elements of J1(x1, y1), y1=M1, M1+1, ..., M1+M2−1 are parity elements of codeword for inter-track error correction coding. The inter-track error correction decoder 15 delivers the inter-track error correction decoded information elements J1' (x1', y1'), x1'=0, 1, ..., N1×L, y1'=0, 1, ..., M1+M2−1 into the second memory 13.

The inter-track error correction coded information elements J1' (x1', y1') are stored in the second memory 13. At this time, the relation between addresses x1', y1' of inter-track error correction decoded information elements J1'(x1', y1') and addresses p', q', r' of the second memory 13 is shown in formula (11).

$$p' = ((x1'/N1) + (y1' \times d)) \mod L$$

$$q' = y1'$$

$$r' = (x1' + y1') \mod N1 \quad (11)$$

where $$p' = 0, 1, \ldots, L-1$$

$$q' = 0, 1, \ldots, M1-1$$

$$r' = 0, 1, \ldots, N1-1$$

$$x1' = 0, 1, \ldots, N1 \times L-1$$

$$y1' = 0, 1, \ldots, M1-1$$

$$d = 3$$

The second controller 16 generates addresses p', q', r' of the second memory 13 so as to store the information elements decoded in the inter-track error correction decoder 15 into the second memory 13 according to formula (11).

Thus reproduced data are processed by triple error correction decoding. Consequently, the data stored in the second memory 13 is put out into a deformatter 17. In the deformatter 17, data in the size of M1×N1×L symbols are delivered in the sequence of input at the time of recording. Supposing the output data to be A'(b'), b'=0, 1, ... , M1×N1×L−1 in the sequence of output, the relation between output number b' of data A'(b') and addresses p', q', r' of data E1'(p', q', r') stored in the second memory 13 is shown in formula (12).

$$p' = \lfloor b'/(M1 \times N1) \rfloor$$

$$q' = \lfloor (b' \mod M1)/N1 \rfloor$$

$$r' = b' \mod M1 \times N1 \quad (12)$$

where $$p' = 0, 1, \ldots, L-1$$

$$q' = 0, 1, \ldots, M1-1$$

$$r' = 0, 1, \ldots, N1-1$$

$$b' = 0, 1, \ldots, M1 \times N1 \times L-1$$

At this time, the second controller 16 generates addresses p', q', r' of the second memory 13 according to the output data number b' and formula (12). To the deformatter 17, the input data block is delivered.

The configuration of the track data at this time is shown in FIG. 6(a). FIG. 6(a) shows the composition of the track, supposing M1=129, M2=9, M3=11, N1=77, N2=8, in which one track comprises a data block region 21 composed of 129 (M1) sync blocks, an inter-track parity region 22 composed of 9 (M2) sync blocks, and an outer parity region 23 composed of 11 (M3) sync blocks.

In the data region 21 are disposed sync blocks generated by inner error correction coding. That is, sync blocks composed of codeword F3(s3) of which remainder of dividing s3 of codeword F3(s3) for inner error correction coding by (M1+M2+M3) is 0 to (M1−1) are disposed sequentially from the codeword smaller in the remainder by dividing by (M1+M2+M3). In the inter-track parity region 22 are disposed sync blocks generated by inner error correction coding of inter-track parity generated by inter-track error correction coding of data blocks. That is, sync blocks composed of codeword F3(s3) of which remainder of dividing s3 of codeword F3(s3) for inner error correction coding by (M1+M2+M3) is M1 to (M1+M2+1) are disposed sequentially from the codeword smaller in the remainder by dividing by (M1+M2+M3). In the outer parity region 23 are disposed sync blocks generated by inner error correction coding of outer parity generated by outer parity error correction coding of data blocks. That is, sync blocks composed of codeword F3(s3) of which remainder of dividing s3 of codeword F3(s3) for inner error correction coding by M1+M2+M3 is M1+M2 to M1+M2+M3−1 are disposed sequentially from the codeword smaller in the remainder by dividing by M1+M2+M3.

A configuration of sync block is shown in FIG. 7. Sync blocks are recorded sequentially, from the beginning, into sync pattern 30, ID31, information element region 32, and parity element region 33. In the information element 32, information elements G3(s3, t3) of codeword for inner error correction coding are arranged in the sequence of t3=0, 1, . . . , N1−1, and in the parity element region 32, parity elements G3(s3, u3) of codeword for inner error correction coding are arranged in the sequence of t3=0, 1, . . . , N2−1.

In this way, at the time of recording, the input data is formatted in data blocks, data blocks are coded by inter-track error correction, inter-track parities are generated, data blocks and inter-track parities are coded by outer error correction to generate outer parities, data blocks, inter-track parities and outer parities are coded by inner error correction, and sync blocks are composed in the unit of code words for inner error correction coding and recorded in a magnetic tape, and when reproducing, reproduced data are in the unit of sync block, data blocks, inter-track parities and outer parities are decoded by inner error correction, data blocks and inter-track parities are decoded by outer error correction by using outer parities, data blocks are decoded by inter-track error correction by using inter-track parities, and data blocks are deformatted, and delivered as data.

Thus, input data are processed by triple error correction coding, recorded, reproduced, and processed by triple error correction decoding, and therefore if the number of tracks in one data block is short, the codeword for inter-track error correction coding can be extended, which is very effective for curtailing circuits in a data recording and reproducing apparatus.

Moreover, by triple error correction coding, recording, reproducing and triple error correction decoding of input data in this manner, the outer error correction encoder, inner error correction encoder, outer error correction decoder, and inner error correction decoder can be shared between the digital data recording and repreducing apparatus and household digital VCR, and recording and reproducing of data at high reliability may be realized, and the unit of single error correction is shorter, so that the memory capacity can be curtailed, which is extremely effective.

Besides, when the data is wrong, the neighboring regions are often continuously wrong. As the data adjacent in the input sequence are adjacently recorded in the magnetic tape 9, if reproduced data is wrong at the time of reproduction, wrong data is locally arranged, and effects of error can be locally limited, so that the effects may be minimized.

In the digital VCR for consumer, auxiliary data block region is provided in part of the track. In this auxiliary data block region, information about the data such as type and kind of data recorded in the track is recorded. This auxiliary data block region is recorded in a fixed position in the track. The data excluding the auxiliary data block region is subjected to inter-track error correction coding, outer error correction coding, and inner error correction coding, and the data recorded in the auxiliary data block region is subjected to outer error correction coding and inner error correction coding only, and such digital data recording and reproducing apparatus is described below.

This is to explain the digital data recording and reproducing apparatus which performs inter-track error correction coding, outer error correction coding, and inner error correction coding in part of the input data, and performs outer error correction coding and inner error correction coding in the remaining data.

In the digital data recording and reproducing apparatus, data in the size of $M1' \times N1 \times L$ ($M1'$ is a natural number) and auxiliary data in the size of $C1 \times N1 \times L$ symbols are supposed to be entered. The data to be recorded is put into the formatter 1. In the formatter 1, the input data is divided into data block subjected to inter-track error correction coding in the size of $M1' \times N1 \times L$ symbols, and auxiliary data block not subjected to inter-track error correction coding in the size of $C1 \times N1 \times L$ symbols, and put into the first memory 2.

After the data block in the size of $M1' \times N1 \times L$ symbols is entered in the formatter 1, the first controller 5 generates addresses of the first memory 2 so that the data of the data block may be sent out from the first memory 2 into the inter-track error correction encoder 3 in every $M1'$ symbols. The inter-track error correction encoder 3, using the input data in the size of $M1'$ symbols as information elements, performs error correction coding to generate inter-track parities in the size of M2 symbols, and sends the generated inter-track parities in the size of M2 symbols out into the first memory 2. This operation is repeated $N1 \times L$ times. The inter-track error correction encoder 3 composes $N1 \times L$ codewords from one data block, generates parity elements in $M2 \times N1 \times L$ symbols, and sends out into the first memory 2.

In consequence, the entered input data, entered auxiliary data, and inter-track parities of input data generated in the inter-track error correction encoder 3 are subjected to outer error correction coding and inner error correction coding as mentioned above, and are recorded in the magnetic tape 9.

Below is described the composition of the entered input data, entered auxiliary data and codeword for inter-track error correction coding. The input data in the size of $M1' \times N1 \times L$ symbols divided by the formatter 1 is supposed to be A1(b1), b1=0, 1, ..., $M1' \times N1 \times L-1$ in the sequence of input. The first memory 2 has an address space of at least $(M1'+C1+M2+M3) \times N1 \times L$, and the addresses are expressed as p, q, r, and the data stored in addresses p, q, r are supposed to be E1(p, q, r). Herein, p=0, 1, ..., L-1, q=0, 1, ..., $M1'+M2+M3-1$, and r=0, 1, ..., N1-1. The relation between number b1 of data A1(b1) and addresses p, q, r of the data E1(p, q, r) stored in the first memory 2 is shown in formula (13).

$$p=\lfloor b1/(M1' \times N1) \rfloor$$

$$q=\lfloor b1 \bmod (M1' \times N1) \rfloor + e$$

$$r=b1 \bmod N1 \qquad (13)$$

where $$p=0, 1, \ldots, L-1$$

$$q=e, e+1, \ldots, M1'+e-1$$

$$r=0, 1, \ldots, N1-1$$

$$b1=0, 1, \ldots, M1' \times N1 \times L-1$$

$$e=2$$

Herein, e is an offset for dispersing the auxiliary data block regions for recording the auxiliary data in the track, and it is a constant of a natural number. The entered auxiliary data in the size of $C1 \times N1 \times L$ (C1 is a natural number) symbols is supposed to be A2(b2), b2=0, 1, ..., $C1 \times N1 \times L-1$ in the sequence of input. The relation between number b2 of data A2(b2) and addresses p, q, r of the data E1(p, q, r) stored in the first memory 2 is shown in formula (14).

$$p=\lfloor b2/(C1 \times N1) \rfloor$$

$$tp=\lfloor b2 \bmod (C1 \times N1) \rfloor$$

$$q=tq \ (tq<e)$$

$$=M1'+tq-e \ (tq>=e)$$

$$r=b2 \bmod N1 \qquad (14)$$

where $$p=0, 1, \ldots, L-1$$

$$q=0, 1, \ldots, e-1, M1'+e, M1'+e+1, \ldots, M1'+C1-1$$

$$r=0, 1, \ldots, N1-1$$

$$b2=0, 1, \ldots, C1 \times N1 \times L-1$$

$$e=2 \ (\text{constant})$$

That is, the entered input data A1(b1) and entered auxiliary data A2(b2) are stored in the addresses shown in formulas (13) and (14) in the first memory 2. At this time, the first controller 5 generates addresses p, q, r of the first memory 2 according to number b1 of the data to be entered, number b2 of the auxiliary data that has been already entered, and formulas (13) and (14).

After input of data block, for inter-track error correction coding, the data stored in the first memory 2 is sent out into the inter-track error correction encoder 3. There are $N1 \times L$ codewords for inter-track error correction coding, and information elements of one codeword are composed of $M1'$ symbols. Suppose the codeword for inter-track error correction coding to be F4(s4), s4=0, 1, ..., $N1 \times L-1$. Also suppose the information element of codeword of F4(s4) to be G4(s4, t4), t4=0, 1, ..., $M1'-1$. The relation between addresses s4, t4 of the information element G4(s4, t4) of the codeword of F4(s4) and addresses p, q, r of the data E1(p, q, r) stored in the memory is shown in formula (15).

If $t4<M1'+e$ $$p=((s4/N1)+(t4 \times d)) \bmod L$$

$$q=t4$$

$$r=(t4+s4) \bmod N1 \qquad (15)$$

If $t4>=M1'+e$ $$p=((s4/N1)+(t4+M2) \times d)) \bmod L$$

$$q=t4+M2$$

$$r=((t4+M2+s4) \bmod N1$$

where $$p=0, 1, \ldots, L-1$$

$q=0, 1, \ldots, M1'+e-1, M1'+M2+e, M1'+M2+e+1, \ldots, M1'+M2+C1-1$ $r=0, 1, \ldots, N1-1$ $s4=0, 1, \ldots, N1 \times L-1$ $t4=0, 1, \ldots, M1'-C1-1$ $d=3$ (constant)

$e=2$ (constant)

The first controller 5 generates addresses p, q, r of the first memory 2 so as to deliver the information elements G4(s4, t4) into the inter-track error correction encoder 3 sequentially and in codeword unit. The inter-track error correction encoder 3 precesses the entered information elements by error correction coding, and generates inter-track parities. The parity element generated by inter-track error correction coding of codeword F4(s4) is supposed to be G4p(s4, u4), $u4=0, 1, \ldots, M2-1$. The codeword at this time is (G4(s4,0), G4(s4,1), ..., G4(s4,t4), ..., G4(s4,M1'-2), G4(s4,M1'-1), G4p(s4,0), G4p(s4,1), ..., G4p(s4,u4), ..., G4p(s4,M2-2), G4p(s4,M2-1))

and the generated inter-track parity is stored in the first memory 2. At this time, the relation between addresses s4, u4 of the inter-track parity element G4p(s4, u4) and addresses p, q, r of the first memory 2 becomes as shown in formula (16).

$p=(s4/N1)+(u4+M1'+e) \times d) \bmod L$ $q=M1'+e+u4$ $r=(M1'+u4+e+s4) \bmod N1$ (16)

where $p=0, 1, \ldots, L-1$ $q=M1'+e, M1'+e+1, \ldots, M1'+e+M2-1$ $r=0, 1, \ldots, N1-1$ $s4=0, 1, \ldots, N1 \times L-1$ $u4=0, 1, \ldots, M2-1$ $d=3$ $e=2$ The controller generates addresses p, q, r of the first memory 2 so that the inter-track parity generated in the inter-track error correction encoder 3 may be stored in the first memory 2 according to formula (16).

The outer error correction coding and inner error correction coding are performed on the basis of formulas (4), (5), (6) and (7).

The reproduced data is decoded by error correction according to formulas (8) and (9), and stored in the second memory 13.

In formulas (4), (5), (6), (7), (8) and (9), however, M1 is replaced by M1'+C1.

After the outer error correction decoded data is stored in the second memory 13, for inter-track error correction decoding, the data stored in the second memory 13 is sent out to the inter-track error correction decoder 15.

There are N1×L codewords for inter-track error correction decoding, and elements of one codeword are composed of (M1'+M2) symbols. Herein, codewords for outer error correction decoding are supposed to be H4(x4), $x4=0, 1, \ldots, N1 \times L-1$, and elements of H4(x4) to be J4(x4, y4), $y4=0, 1, \ldots, M1'+C1+M2-1$. The relation between addresses x4, y4 of element J4(x4, y4) and addresses p', q', r' of element E1'(p', q', r') stored in the second memory 13 is expressed in formula (17).

$p'=((x4/N1)+(y4 \times e)) \bmod L$ $q'=y4+e$ $r'=(x4+y4) \bmod N1$ (17)

where $p'=0, 1, \ldots, L-1$ $q'=e, e+1, \ldots, M1'+M2+e+1$ $r'=0, 1, \ldots, N1-1$ $x4=0, 1, \ldots, N1 \times L-1$ $y4=0, 1, \ldots, M1'+M2-1$ $d=3$ $e=2$ The second controller 16 generates addresses p', q', r' of the second memory 13 so as to deliver the element J4(x4, y4) of codeword H4(x4) sequentially into the inter-track error correction decoder 15. Herein, elements of J4(x4, y4), $y4=0, 1, \ldots, M1'-1$ are information elements of codeword for inter-track error correction, and elements of J4(x4, y4), $y4=M1', M1'+1, \ldots, M1'+M2-1$ are parity elements of codeword for inter-track error correction coding.

The inter-track error correction decoder 15 delivers the decoded information elements J4'(x4', y4'), $x4'=0, 1, \ldots, N1 \times L, y4'=0, 1, \ldots, M1'-1$ into the second memory 13. The element J4'(x4', y4') after inter-track error correction coding is stored in the second memory 13. The relation between addresses x4', y4' of the element J4'(x4', y4') after inter-track error correction decoding and addresses p', q', r' of the second memory 13 at this time is shown in formula (18).

$p'=((x4/N1)+((y4+e) \times d)) \bmod L$ $q'=y4'+e$ $r'=(x4'+e+y4') \bmod N1$ (18)

where $p'=0, 1, \ldots, L-1$ $q'=e, e+1, \ldots, M1'+e-1$ $r'=0, 1, \ldots, N1-1$ $x4'=0, 1, \ldots, N1 \times L-1$ $y4'=0, 1, \ldots, M1'-1$ $d=3$ $e=2$ The controller generates address p', q', r' of the second memory 13 so that the data decoded in the inter-track error correction decoder 15 may be stored in the second memory 13 according to formulas (17) and (18).

The data stored in the second memory 13 is delivered to the deformatter 17. The deformatter 17 delivers the triple decoded data in the size of M1'×N1×L symbols in the recorded sequence. Supposing the output data to be A1'(b1'), b1'=0, 1, . . . , M1'×N1×L−1 in the sequence of output, the relation between number b1' for output of data A1'(b1') and addresses p', q', r' of the data E1'(p', q', r') stored in the second memory 13 is shown in formula (19).

$$p' = \lfloor b1'/(M1' \times N1) \rfloor$$

$$q' = \lfloor b1' \bmod (M1' \times N1) \rfloor + e$$

$$r' = b1' \bmod N1 \quad (19)$$

where $$p' = 0, 1, \ldots, L-1$$

$$q' = e, e+1, \ldots, M1'+e-1$$

$$r' = 0, 1, \ldots, N1-1$$

$$b1' = 0, 1, \ldots, M1' \times N1 \times L-1$$

$$e = 2$$

At this time, the second controller 16 generates addresses p', q', r' of the memory 16 according to number b1' of the output data and formula (12). Besides, in the deformatter 17, the auxiliary data in the size of C1×N1×L symbols is delivered in the recorded sequence. Supposing the auxiliary data to be delivered to be A2'(b2'), b2'=0, 1, . . . , C1×N1×L−1 in the sequence of output, the relation between number b2' for output of data A2'(b2') and addresses p', q', r' stored in the second memory 13 is as shown in formula (20).

$$p' = \lfloor b2'/(C1 \times N1) \rfloor$$

$$tq = \lfloor b2' \bmod C1/N1 \rfloor$$

$$q' = tq \quad (tq < e)$$

$$= M1' + M2 + tq \quad (tq \geq e)$$

$$r' = b2' \bmod N1 \quad (20)$$

where $$p' = 0, 1, \ldots, L-1$$

$$q' = 0, 1, \ldots, e-1, M1'+M2, M1'+M2+1, \ldots, M1'+M2+C1-1$$

$$r' = 0, 1, \ldots, N1-1$$

$$b2' = 0, 1, \ldots, C1 \times N1 \times L-1$$

$$e = 2 \text{ (constant)}$$

At this time, the second controller 16 generates addresses p', q', r' of the memory 16 according to number b2' of output data and formula (20). In this way, part of input data is recorded by triple error correction coding, and auxiliary data, by double error correction coding.

A data configuration of track at this time is shown in FIG. 6(b). FIG. 6(b) shows the composition of track supposing M1=126, M2=9, M3=11, C1=3, N1=77, N2=8, and e=2. One track comprises a data block region 21 composed of 126 (M1) sync blocks, an inter-track parity region 22 composed of 9 (M2) sync blocks, an outer parity region 23 composed of 11 (M3) sync blocks, a first auxiliary data block region 24 composed of 2 (e) sync blocks, and a second auxiliary data block region 25 composed of 1 (C1−e) sync block.

In the data block region 21 are disposed sync blocks generated by inner error correction coding. That is, sync blocks composed of codeword F3(s3) of which remainder of dividing s3 of codeword F3(s3) for inner error correction coding by M1+C1+M2+M3 is e to M1+e−1 are disposed sequentially from the codeword smaller in the remainder by dividing by M1'+C1+M2+M3.

In the inter-track parity region 22 are disposed sync blocks generated by inner error correction coding of inter-track parity generated by inter-track error correction coding of data blocks. That is, sync blocks composed of codeword F3(s3) of which remainder of dividing s3 of codeword F3(s3) for inner error correction coding by M1'+C1+M2+M3 is M1+C1 to M1+C1+M2−1 are disposed sequentially from the codeword smaller in the remainder by dividing by M1'+C1+M2+M3.

In the outer parity region 23 are disposed sync blocks generated by inner error correction coding of outer parity generated by outer parity error correction coding of data blocks. That is, sync blocks composed of codeword F3(s3) of which remainder of dividing s3 of codeword F3(s3) for inner error correction coding by M1'+C1+M2+M3 is M1'+C1+M2 to M1+C1+M2+M3−1 are disposed sequentially from the codeword smaller in the remainder by dividing by M1'+C1+M2+M3.

In the first auxiliary data block region 24 are disposed sync blocks generated by inner error correction coding of part of auxiliary data blocks. That is, sync blocks composed of codeword F3(s3) of which remainder of dividing s3 of codeword F3(s3) for inner error correction coding by M1'+C1+M2+M3 is 0 to e−1 are disposed sequentially from the codeword smaller in the remainder by dividing by M1'+C1+M2+M3. In the second auxiliary data block region 25 are disposed sync blocks generated by inner error correction coding of the remaining auxiliary data blocks. That is, sync blocks composed of codeword F3(s3) of which remainder of dividing s3 of codeword F3(s3) for inner error correction coding by M1'+C1+M2+M3 is e+M1−1 to M1+C1−1 are disposed sequentially from the codeword smaller in the remainder by dividing by M1'+C1+M2+M3.

In this way, at the time of recording, the input data and auxiliary data are formatted in data blocks and auxiliary data blocks, data blocks are coded by inter-track error correction to generate inter-track parities, data blocks, auxiliary data and inter-track parities are coded by outer error correction to generate outer parities, data blocks, auxiliary data blocks, inter-track parities and outer parities are coded by inner error correction, and sync blocks are composed in the unit of codewords for inner error correction coding and recorded in a magnetic tape, and when reproducing, reproduced data are in the unit of sync block, data blocks, auxiliary data blocks, inter-track parities and outer parities are decoded by inner error correction, data blocks, auxiliary data blocks and inter-track parities are decoded by outer error correction by using outer parities, data blocks and auxiliary data blocks are decoded by inter-track error correction by using inter-track parities, and data blocks and auxiliary data blocks are deformatted, and delivered as data and auxiliary data.

Thus, input data are processed by triple error correction coding, recorded, reproduced, and processed by triple error correction decoding, and therefore if the number of tracks in one data block is short, the codeword for inter-track error correction coding can be extended, which is very effective for curtailing circuits in a data recording and reproducing apparatus.

As for the entered auxiliary data, inter-track error correction coding is also described below.

In the digital data recording and reproducing apparatus, suppose data in the size of M1'×N1×L symbols and auxiliary data in the size of C1×N1×L symbols are entered. The data to be recorded is entered in the formatter 1. In the formatter 1, the entered data is divided into data blocks subjected to inter-track error correction coding in the size of M1'×N1×L symbols, and auxiliary data blocks not subjected to inter-track error correction coding in the size of C1×N1×L symbols, and put into the first memory 2.

After the data blocks in the size of M1'×N1×L symbols, and auxiliary data blocks in the size of C1×N1×L symbols are entered in the formatter 1, the first controller 5 generates addresses of the first memory 2 so that the data in the data blocks and data in the auxiliary data blocks may be put out from the first memory 2 into the inter-track error correction encoder 3 in every (M1'+C1) symbols. The inter-track error correction encoder 3, using the input data in the size of (M1'+C1) symbols as information elements, performs error correction coding for generating inter-track parities in the size of M2 symbols, and delivers the generated inter-track parities in the size of M2 symbols into the first memory 2. This operation is repeated N1×L times. The inter-track error correction encoder 3 composes N1×L codewords from one data block and auxiliary data block, and generates parity elements of M2×N1×L symbols, and delivers into the first memory 2.

Consequently, the entered input data, entered auxiliary data, and inter-track parities of input data generated in the inter-track error correction encoder 3 are subjected to outer error correction coding and inner error correction coding as mentioned earlier, and are recorded in the magnetic tape 9.

Here is described the composition of the entered input data, entered auxiliary data, and codeword for inter-track error correction coding. The input data in the size of M1'×N1×L symbols divided in the formatter 1 to be A3(b3), b3=0, 1, ..., M1'×N1×L−1 in the sequence of input. The input data in the size of C1×N1×L symbols divided in the formatter 1 to be A4(b4), b4=0, 1, ..., C1×N1×L−1 in the sequence of input. The first memory 2 has at least an address space of (M1'+C1+M2+M3)×N1×L, and the addresses are expressed as p, q, r, and the data to be stored in the addresses p, q, r is supposed to be E1(p, q, r). Herein, p=0, 1, ..., L−1, q=0, 1, ..., M1'+C1+M2+M3−1, and r=0, 1, N1−1. The relation of number b3 of data A3(b3), number b4 of data A4(b4), and addresses p, q, r of data E1(p, q, r) stored in the first memory 2 is shown in formula (21).

$$p=\lfloor b3/(M1'\times N1)\rfloor$$

$$q=\lfloor b3 \bmod (M1'\times N1)\rfloor +e$$

$$r=b3 \bmod N1 \quad (21)$$

where $$p=0, 1, \ldots, L-1$$

$$q=0, 1, \ldots, M1'+C1-1$$

$$r=0, 1, \ldots, N1-1$$

$$b3=0, 1, \ldots, M1'\times N1\times L-1$$

$$e=2$$

The entered auxiliary data in the size of C1×N1×L symbols are supposed to be A4(b4), b4=0, 1, ..., C1×N1×L−1 in the sequence of input. The relation between number b4 of data A4(b4) and addresses p, q, r of the data E1(p, q, r) stored in the memory 2 is shown in formula (22).

$$p=\lfloor b4/(C1\times N1)\rfloor$$

$$tq=\lfloor b4 \bmod (C1\times N1)\rfloor$$

$$q=tq \quad (tq<e)$$

$$=M1'+M2+tq \quad (tq>=e)$$

$$r=b4 \bmod N1 \quad (22)$$

where $$p=0, 1, \ldots, L-1$$

$$q=0, 1, \ldots, e-1, M1'+M2, M1'+M2+1, \ldots, M1'+M2+C1-1$$

$$r=0, 1, \ldots, N1-1$$

$$b2=0, 1, \ldots, C1\times N1\times L-1$$

$$e=2 \text{ (constant)}$$

That is, the entered input data A3(b3) and entered auxiliary data A3(b3) are stored in the addresses indicated by formulas (21) and (22) in the first memory 2. At this time, the first controller 5 generates addresses p, q, r of the first memory 2 according to number b3 of data to be entered, number b4 of auxiliary data that has been entered, and formulas (21) and (22).

For inter-track error correction coding, the data stored in the first memory 2 is sent out into the inter-track error correction encoder 3. There are N1×L codewords for inter-track error correction coding, and information elements of one codeword are composed of M1' symbols. Suppose the codewords of inter-track error correction coding to be F5(s5), s5=0, 1, ..., N1×L−1. Also suppose the information elements of codeword of F4(s4) to be G5(s5, t5), t5=0, 1, ..., M1'+C1−1. The relation between addresses s5, t5 of the information element G5(s5, t5) of codeword of F5(s5) and addresses p, q, r of the element E1(p, q, r) stored in the memory is shown in formula (23).

If t5<M1'+e−1

$$p=((s5/N1)+(t5\times d))\bmod L$$

$$q=t5$$

$$r=(t5+s5) \bmod N1 \quad (23)$$

If t5>M1'+C1−e $$p=((s5/N1)+((t5+M2)\times d))\bmod L$$

$$q=t5+M2$$

$$r=(t5+M2+s5) \bmod N1$$

where $$p=0, 1, \ldots, L-1$$

$$q=0, 1, \ldots, M1'+e-1, M1'+M2+e, M1'+M2+e+1, \ldots, M1'+M2+C1-1$$

$$r=0, 1, \ldots, N1-1$$

$$s5=0, 1, \ldots, N1\times L-1$$

$$t5=0, 1, \ldots, M1'-C1-1$$

$$d=3 \text{ (constant)}$$

$$e=2 \text{ (constant)}$$

The first controller 5 generates addresses p, q, r of the first memory 2 so as to deliver the information elements G5(s5, t5) into the inter-track error correction encoder 3 sequentially and in the codeword unit. The inter-track error correction encoder 3 encodes the entered information elements, and generates inter-track parities. Parity elements generated by inter-track error correction coding of codeword F5(s5) are supposed to be G5p(s5, u5), u5=0, 1, . . . , M2−1. At this time, the codeword is (G5(s5,0), G5(s5,1), . . . , G5(s5,t5), . . . , G5(s5,M1'+C1−2), G5(s5,M1'+C1−1), G5p(s5,0), G5p(s5,1), . . . , G5p(s5,u5), . . . , G5p(s5,M2−2), G5p(s5,M2−1))

and the generated inter-track parity is stored in the first memory 2. The relation between addresses s5, u5 of the inter-track element G5p(s5, u5) at this time and addresses p, q, r of the first memory 2 is shown in formula (24).

$$p=((s5/N1)+((u5+e+M1')\times d)) \bmod L$$

$$q=M1'+e+u5$$

$$r=(M1'+u5+e+s5) \bmod N1 \quad (24)$$

where $$p=0, 1, \ldots, L-1$$

$$q=M1'+e, M1'+e+1, \ldots, M1'+e+M2-1$$

$$r=0, 1, \ldots, N1-1$$

$$s5=0, 1, \ldots, N1 \times L-1$$

$$u5=0, 1, \ldots, M2-1$$

$$d=3$$

$$e=2$$

The controller generates addresses p, q, r of the first memory 2 so as to store the inter-track parity generated in the inter-track error correction encoder 3 into the first memory 2 according to formula (24).

Outer error correction coding and inner error correction coding are performed in accordance with formulas (4), (5), (6) and (7).

The reproduced data is decoded according to formulas (8) and (9), and stored in the second memory 13.

In formulas (4), (5), (6), (7), (8) and (9), however, M1 is replaced by M1'+C1.

After the data by outer error correction decoding is stored in the second memory 13, for inter-track error correction decoding, the data stored in the second memory 13 is put out into the inter-track error correction decoder 15.

There are N1×L codewords for inter-track error correction decoding, and elements of one codeword are composed of (M1'+M2) symbols. Herein, codewords for outer error correction decoding are supposed to be H5(x5), x5=0, 1, . . . , N1×L−1, and elements of H5(x5) to be J5(x5, y5), y5=0, 1, . . . , M1'+C1+M2−1. The relation between addresses x5, y5 of element J5(x5, y5) and addresses p', q', r' of element E1'(p', q', r') stored in the second memory 13 is expressed in formula (25).

If y5<M1'+e, $$p'=((x5/N1)+(y5 \times e)) \bmod L$$

$$q'=y5$$

$$r'=(x5+y5) \bmod N1 \quad (25)$$

If y5=>M1'+e and y5<M1'+C1, $$p'=((x5/N1)+((y5+M2) \times e)) \bmod L$$

$$q'=y5+M2$$

$$r'=(x5+y5+M2) \bmod N1$$

If y5=>M1'+C1, $$p'=((x5/N1)+((y5-C1+e) \times e)) \bmod L$$

$$q'=y5-C1+e$$

$$r'=(x5-C1+e+y5) \bmod N1$$

where $$p'=0, 1, \ldots, L-1$$

$$q'=0, 1, \ldots, M1'+M2+C1-1$$

$$r'=0, 1, \ldots, N1-1$$

$$x4=0, 1, \ldots, N1 \times L-1$$

$$y4=0, 1, \ldots, M1'+M2-1$$

$$d=3$$

$$e=2$$

The second controller 16 generates addresses p', q', r' of the second memory 13 so as to deliver the element J5(x5, y5) of codeword H5(x5) sequentially into the inter-track error correction decoder 15. Herein, elements of J5(x5, y5), y5=0, 1, . . . , M1'+C1−1 are information elements of codeword for inter-track error correction, and elements of J5(x5, y5), y5=M1'+C1, M1'+C1+1, . . . , M1'+M2+C1−1 are parity elements of codeword for inter-track error correction coding.

The inter-track error correction decoder 15 delivers the decoded information elements J5'(x5', y5'), x5'=0, 1, . . . , N1×L, y5'=0, 1, . . . , M1'+C1−1 into the second memory 13. The element J5'(x5', y5') after inter-track error correction coding is stored in the second memory 13. The relation between addresses x5', y5' of the element J5'(x5', y5') after inter-track error correction decoding and addresses p', q', r' of the second memory 13 at this time is shown in formula (26).

If y5<M1'+e, $$p'=((x5'/N1)+(y5' \times d)) \bmod L$$

$$q'=y5'$$

$$r'=(y5'+x5') \bmod N1 \quad (26)$$

If y5>=M1'+e, $$p'=((x5/N1)+(y5'+M2) \times d)) \bmod L$$

$$q'=y5'+M2$$

$$r'=(y5'+M2+y5') \bmod N1$$

where $$p'=0, 1, \ldots, L-1$$

$$q'=0, 1, \ldots, M1'+e-1, M1'+M2+e, M1'+M2+e+1, \ldots, M1'+M2+C1-1$$

$$r'=0, 1, \ldots, N1-1$$

$x5'=0, 1, \ldots, N1 \times L-1$ $y5'=0, 1, \ldots, M1'-C1-1$ $d=3$ (constant)

$e=2$ (constant)

The controller generates address p', q', r' of the second memory 13 so that the data decoded in the inter-track error correction decoder 15 may be stored in the second memory 13 according to formula (26).

The data store in the second memory 13 is delivered to the deformatter 17. The deformatter 17 delivers the triple decoded data in the size of M1'×N1×L symbols in the recorded sequence. Supposing the output data to be A3'(b3'), b3'=0, 1, ..., M1'×N1×L−1 in the sequence of output, the relation between number b3' for output of data A3'(b3') and addresses p', q', r' of the data E1'(p', q', r') stored in the second memory 13 is shown in formula (27).

$p'=\lfloor b3'/(M1' \times N1) \rfloor$ $q'=\lfloor b3' \mod (M1' \times N1) \rfloor + e$ $r'=b3' \mod N1$     (27)

where $p'=0, 1, \ldots, L-1$ $q'=e, e+1, \ldots, M1'+e-1$ $r'=0, 1, \ldots, N1-1$ $b3'=0, 1, \ldots, M1' \times N1 \times L-1$ $e=2$ At this time, the second controller 16 generates addresses p', q', r' of the memory 16 according to number b3' of the output data and formula (27). Besides, in the deformatter 17, the auxiliary data in the size of C1×N1×L symbols is delivered in the recorded sequence. Supposing the auxiliary data to be delivered to be A4'(b4'), b4'=0, 1, ..., C1×N1×L−1 in the sequence of output, the relation between number b4' for output of data A4'(b4') and addresses p', q', r' stored in the second memory 13 is as shown in formula (28).

$p'=\lfloor b4'/(C1 \times N1) \rfloor$ $tq=\lfloor b4' \mod C1/N1 \rfloor$ $q'=tq$    $(tq<e)$ $=M1'+tq-e$    $(tq>=e)$ $r'=b4' \mod N1$     (28)

where $p'=0, 1, \ldots, L-1$ $q'=0, 1, \ldots, e-1, M1'+e, M1'+e+1, \ldots, M1'+c1-1$ $r'=0, 1, \ldots, N1-1$ $b4'=0, 1, \ldots, C1 \times N1 \times L-1$ $e=2$ (constant)

At this time, the second controller 16 generates addresses p', q', r' of the memory 16 according to number b4' of output data and formula (28).

In this way, the input data and auxiliary data are recorded after triple error correction coding.

A data configuration of track at this time is shown in FIG. 6(c). One track comprises a data block region 21 composed of 126 (M1) sync blocks, an inter-track parity region 22 composed of 9 (M2) sync blocks, an outer parity region 23 composed of 11 (M3) sync blocks, a first auxiliary data block region 24 composed of 2 (e) sync blocks, and a second auxiliary data block region 25 composed of 1 (C1−e) sync block.

In the data block region 21 are disposed sync blocks generated by inner error correction coding. That is, sync blocks composed of codeword F3(s3) of which remainder of dividing s3 of codeword F3(s3) for inner error correction coding by M1'+C1+M2+M3 is e to M1+e−1 are disposed sequentially from the codeword smaller in the remainder by dividing by M1'+C1+M2+M3.

In the inter-track parity region 22 are disposed sync blocks generated by inner error correction coding of inter-track parity generated by inter-track error correction coding of data blocks. That is, sync blocks composed of codeword F3(s3) of which remainder of dividing s3 of codeword F3(s3) for inner error correction coding by M1'+C1+M2+M3 is M1+C1 to M1+C1+M2−1 are disposed sequentially from the codeword smaller in the remainder by dividing by M1'+C1+M2+M3.

In the outer parity region 23 are disposed sync blocks generated by inner error correction coding of outer parity generated by outer parity error correction coding of data blocks. That is, sync blocks composed of codeword F3(s3) of which remainder of dividing s3 of codeword F3(s3) for inner error correction coding by M1'+C1+M2+M3 is M1'+C1+M2 to M1+C1+M2+M3−1 are disposed sequentially from the codeword smaller in the remainder by dividing by M1'+C1+M2+M3.

In the first auxiliary data block region 24 are disposed sync blocks generated by inner error correction coding of part of auxiliary data blocks. That is, sync blocks composed of codeword F3(s3) of which remainder of dividing s3 of codeword F3(s3) for inner error correction coding by M1'+C1+M2+M3 is 0 to (e−1) are disposed sequentially from the codeword smaller in the remainder by dividing by M1'+C1+M2+M3. In the second auxiliary data block region 25 are disposed sync blocks generated by inner error correction coding of the remaining auxiliary data blocks. That is, sync blocks composed of codeword F3(s3) of which remainder of dividing s3 of codeword F3(s3) for inner error correction coding by M1'+C1+M2+M3 is e+M1−1 to M1+C1−1 are disposed sequentially from the codeword smaller in the remainder by dividing by M1'+C1+M2+M3.

In this way, at the time of recording, the input data and auxiliary data are formatted in data blocks and auxiliary data blocks, data blocks and auxiliary data blocks are coded by inter-track error correction to generate inter-track parities, data blocks, auxiliary data and inter-track parities are coded by outer error correction to generate outer parities, data blocks, auxiliary data blocks, inter-track parities and outer parities are coded by inner error correction, and sync blocks are composed in the unit of codewords for inner error correction coding and recorded in a magnetic tape, and when reproducing, reproduced data are in the unit of sync block, data blocks, auxiliary data blocks, inter-track parities and outer parities are decoded by inner error correction, data blocks, auxiliary data blocks and inter-track parities are decoded by outer error correction by using outer parities, data blocks and auxiliary data blocks are decoded by inter-track error correction by using inter-track parities, and data blocks and auxiliary data blocks are deformatted, and delivered as data and auxiliary data.

Thus, input data are processed by triple error correction coding, recorded, reproduced, and processed by triple error correction decoding, and therefore if the number of tracks in one data block is short, the codeword for inter-track error correction coding can be extended, which is very effective for curtailing circuits in a data recording and reproducing apparatus.

In this embodiment, as the ID, the sync block number in the track is recorded, but it may be any specific number that identifies the codeword for inter-track error correction coding and outer error correction coding.

Figure 8:
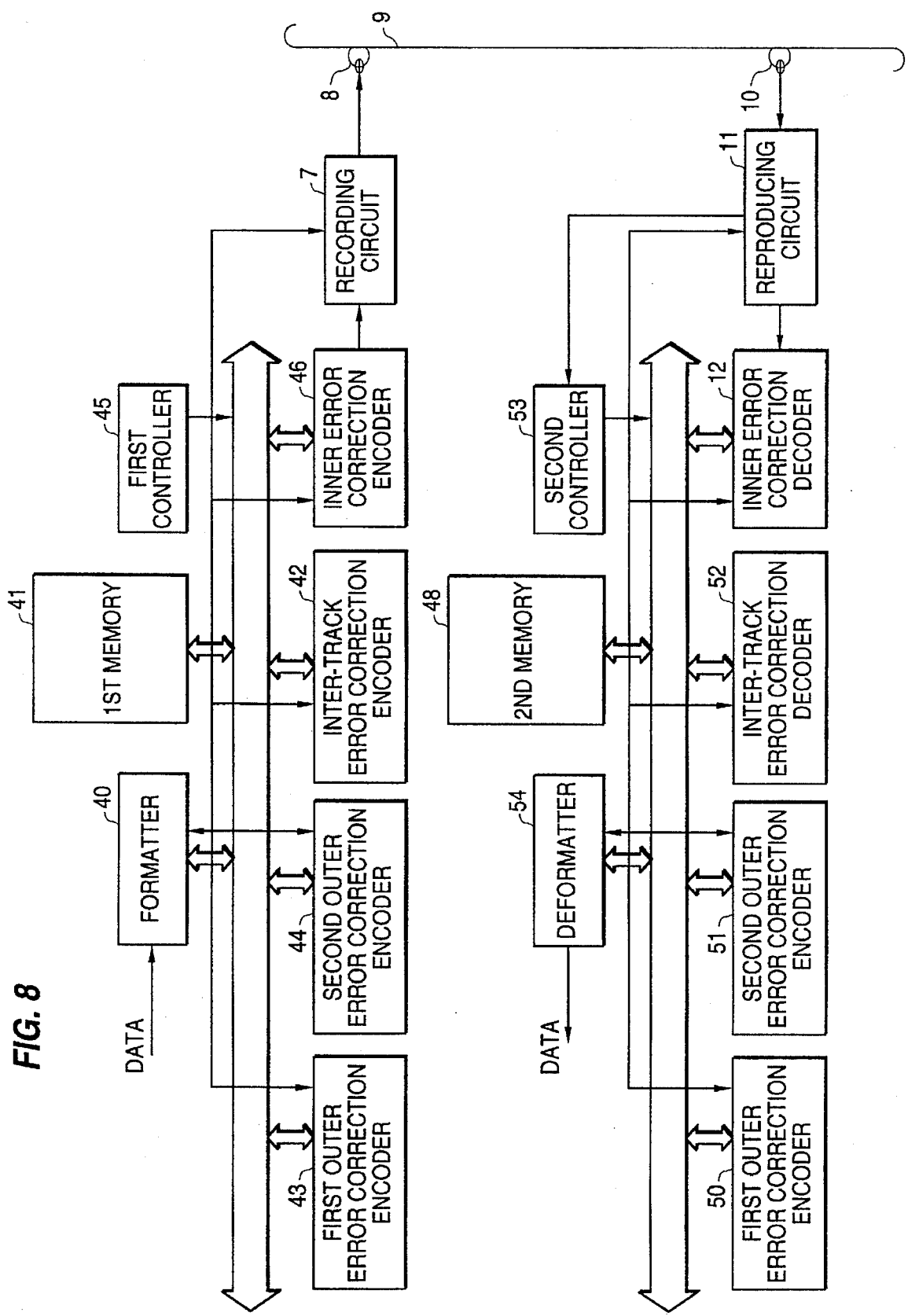
FIG. 8 is a block diagram of a digital data recording and reproducing apparatus in a third embodiment of the invention.

FIG. 8 is a block diagram of a digital data recording and reproducing apparatus in a third embodiment of the invention. The data to be recorded is entered in a formatter 40. In the formatter 40, the entered data is divided into a first data block in the size of M1×N1×L symbols, a second data block in the size of D1×N1×L(D1 is a natural number) symbols, and an auxiliary data block in the size of C1×N1×L symbol, and entered into a first memory 41. Herein, L is the number of tracks in a magnetic tape for recording data blocks.

After the first data block in the size of M1×N1×L symbols, the second data block in the size of D1×N1×L symbols, and the auxiliary data block in the size of C1×N1×L symbol are entered in the formatter 40, a first controller 45 generates addresses of the first memory 41 so that the data in the data blocks may be delivered from the first memory 41 into an inter-track error correction encoder 42 in every M1+D1 symbols. The inter-track error correction encoder 42, using the entered M1 symbols as information elements, performs error correction coding for generating inter-track parities in the size of M2 symbols, and delivers the generated inter-track parities in the size of M2 symbols into the first memory 41. This operation is repeated N1×L times. The inter-track error correction encoder 42 composes N1×L codewords from one data block, and generates M2×N1×L parity elements, and sends them out into the first memory 41.

After inter-track error correction, the first controller 45 generates addresses of the first memory 41 so as to deliver the first data block, auxiliary data block and second parity from the first memory 41 into a first outer error correction encoder 43 in every (M1+C1+M2) symbols. The first outer error correction encoder 43, using the entered (M1+C1+M2) symbols as information elements, performs error correction coding for generating a first outer parity in the size of M3 symbols, and delivers the generated first outer parity in the size of M3 symbols into the first memory 41. This operation is repeated N1×L times.

Moreover, the first controller 45 generates addresses of the first memory 41 so as to deliver the second data block from the first memory 41 into a second outer error correction encoder 44 in every D1 symbols. The second outer error correction encoder 44, using the entered D1 symbols as information elements, performs error correction coding for generating a second outer parity in the size of D2 (D2 is a natural number) symbols, and delivers the generated second outer parity in the size of D2 into the first memory 41. This operation is repeated N1×L times.

After first outer error correction coding and second outer error correction coding, the first controller 45 generates addresses of the first memory 41 so as to deliver the first data block, second data block, auxiliary data block, inter-track parity, first outer parity, and second outer parity from the first memory 41 into an inner error correction encoder 46 in every N1 symbols. The inner error correction encoder 46, using the entered N1 symbols as information elements, performs error correction coding for generating an inner parity in the size of N2 symbols, and delivers the entered information elements in the size of N1 symbols and generated inner parity in the size of N2 symbols into a recording circuit 7. This operation is repeated (M1+C1+M2+M3+D1+D2)×L times. The inner error correction encoder 46 composes (M1+C1+M2+M3+D1+D2)×L codewords from data in the size of (M1+C1+M2+M3+D1+D2)×N1×L symbols, generates (M1+C1+M2+M3+D1+D2)×N2×L parity elements, and delivers into the recording circuit 7.

Below is described the composition of codewords of inter-track error correction coding, outer error correction coding, and inner error correction coding. The first data block in the size of M1×N1×L symbols divided in the formatter 40 is supposed to be A5(b5), b5=0, 1, . . . , M1×N1×L−1 in the sequence of input. The first memory 41 has at least an address space of (M1+M2+M3+D1+D2)× N1×L, and addresses are expressed as p, q, r, and the data stored in the addresses p, q, r are supposed to be E2(p, q, r). Herein, p=0, 1, . . . , L−1, q=0, 1, . . . , M1+M2+M3+D1+D2−1, and r=0, 1, . . . , N1−1. Herein, the relation between number b5 of data A5(b5) of the entered first data block, and addresses p, q, r of data E2(p, q, r) stored in the first memory 41 is shown in formula (29).

$p=\lfloor b5/(M1 \times N1) \rfloor$ $q=(b5 \bmod (M1 \times N1))+D1+D2+e$ $r=b5 \bmod N1$ \hfill (29)

where $p=0, 1, \ldots, L-1$ $q=D1+D2+e, D1+D2+e+1, \ldots, D1+D2+e+M1-1$ $r=0, 1, \ldots, N1-1$ $b5=0, 1, \ldots, M1 \times N1 \times L-1$ $e=2$ That is, the entered data A5(b5) is stored in the address of the first memory 41 shown in formula (29). At this time, the first controller 45 generates addresses p, q, r of the first memory 41 according to the entered data number b5 and formula (29).

The second data block in the size of D1×N1×L symbols divided in the formatter 40 is supposed to be A6(b6), b6=0, 1, . . . , D1×N1×L−1. Herein, the relation between number b6 of the entered data A6(b6) of the second data block and addresses p, q, r of data E2(p, q, r) stored in the first memory 41 is shown in formula (30).

$p=\lfloor b6/(D1 \times N1) \rfloor$ $q=(b6 \bmod (D1 \times N1))$ $r=b6 \bmod N1$ \hfill (30)

where $p=0, 1, \ldots, L-1$ $q=0, 1, \ldots, D1-1$ $r=0, 1, \ldots, N1-1$ $b6=0, 1, \ldots, D1 \times N1 \times L-1$ That is, the entered data A6(b6) is stored in the address of the first memory 41 shown in formula (30). At this time, the first controller 45 generates addresses p, q, r of the first memory 41 according to the entered data number b6 and formula (30).

For inter-track error correction coding, the data stored in the first memory 41 is delivered into the inter-track error correction encoder 42. There are N1×L codewords for inter-track error correction coding, and information elements of one codeword are composed of M1+D1 symbols. Herein, the codeword for inter-track error correction coding is supposed to be F6(s6), s6=0, 1, ..., N1×L−1. Information elements of codeword F6(s6) are supposed to be G6(s6, t6), t6=0, 1, ..., M1+D1−1. The relation between address as s6, t6 of the information element G6(s6, t6) of codeword F6(s6) and addresses p, q, r of data E2(p, q, r) stored in the memory is shown in formula (31).

If t6<D1, $$p=((s6/N1)+(t6 \times d)) \bmod L$$

$$q=t6$$

$$r=(t6+s6) \bmod N1 \quad (31)$$

If t6=>D1, $$p=((s6/N1)+((t6+D2+e) \times d)) \bmod L$$

$$q=t6+D2+e$$

$$r=(t6+D2+e+s6) \bmod N1$$

where $$p=0, 1, \ldots, L-1$$

$$q=0, 1, \ldots, D1-1, D1+D2+e, D1+D2+e+1, \ldots, D1+D2+e+M1-1$$

$$r=0, 1, \ldots, N1-1$$

$$s6=0, 1, \ldots, N1 \times L-1$$

$$t6=0, 1, \ldots, M1+D1-1$$

$$d=3$$

$$e=2$$

The first controller 45 generates addresses p, q, r of the first memory 41 so as to deliver the information elements G6(s6, t6) into the inter-track error correction encoder 42 sequentially and in the codeword unit. Herein d is an offset for dispersing the codewords for inter-track error correction over tracks. The inter-track error correction encoder 42 encodes the entered information elements, and generates inter-track parities. The parity element generated at the time of inter-track error correction coding of codeword F6(s6) is supposed to be G6p(s6, u6), u6=0, 1, ..., M2−1. At this time, the codeword for inter-track error correction is (G6(s6,0), G6(s6,1), ..., G6(s6,t6), ..., G6(s6,M1+D1−2), G6(s6,M1+D1−1), G6P(s6,0), G6p(s6,1), ..., G6p(s6,u6), ..., G6p(s6,M2−2), G6p(s6,M2−1))

and the generated inter-track parity is stored in the first memory 41. At this time, the relation between addresses s6, u6 of the parity element G6p(s6, u6) and addresses p, q, r of the first memory 41 is as shown in formula (32).

$$p=((s6/N1)+((u6+D1+D2+e+M1) \times d)) \bmod L$$

$$q=u6+D1+D2+e+M1$$

$$r=(t6+D1+D2+e+M1+s6) \bmod N1 \quad (32)$$

where $$p=0, 1, \ldots, L-1$$

$$q=D1+D2+e+M1, D1+D2+e+M1+1, \ldots, D1+D2+e+M1+M2-1$$

$$r=0, 1, \ldots, N1-1$$

$$s6=0, 1, \ldots, N1 \times L-1$$

$$u6=0, 1, \ldots, M2-1$$

$$e=2$$

The controller generates addresses p, q, r of the first memory 41 so as to store the inter-track parity generated in the inter-track error correction encoder 42 into the first memory 41 according to formula (32).

Suppose the auxiliary data block in the size of C1×N1×L symbols divided in the formatter 40 to be A7(b7), b7=0, 1, ..., C1×N1×L−1 in the sequence of input. The relation between number b7 of data A7(b7) of the entered auxiliary data block and addresses p, q, r of data E2(p, q, r) stored in the first memory 41 is shown in formula (33).

$$p=|b7/(C1 \times N1)|$$

$$tq=|b7 \bmod (C1 \times N1)|$$

$$q=D1+D2+tq \quad (tq<e)$$

$$=D1+D2+M1+tq \quad (tq>=e)$$

$$r=b7 \bmod N1 \quad (33)$$

where $$p=0, 1, \ldots, L-1$$

$$q=D1+D2, D1+D2+1, \ldots, D1+D2+e-1, D1+D2+M1+e, D1+D2+M1+e+1, \ldots, D1+D2+M1+C1-1$$

$$r=0, 1, \ldots, N1-1$$

$$b7=0, 1, \ldots, C1 \times N1 \times L-1$$

That is, data A7(b7) of the entered auxiliary block is stored in the address indicated by formula (33) in the first memory 41. At this time, the first controller 45 generates addresses p, q, r of the first memory 41 according to number b7 of the data to be entered and formula (33).

After inter-track error correction coding, for first outer error correction coding, the first data block, auxiliary data block, and inter-track parity data stored in the first memory 41 are delivered into the first outer error correction encoder 43.

There are N1×L codewords for first outer error correction coding, and information elements of one codeword are composed of M1+C1+M2 symbols. Suppose the codeword for first outer error correction coding to be F7(s7), s7=0, 1, ..., N1×L−1. Also suppose the information element of codeword F7(s7) to be G7(s7, t7), t7=0, 1, ..., M1+C1+M2−1. The relation between addresses s7, t7 of information element G7(s7, t7) of codeword F7(s7), and addresses p, q, r of data E2(p, q, r) stored in the memory is shown in formula (34).

$$p=|s7/N1|$$

$$q=t7+D1+D2$$

$$r=s7 \bmod N1 \quad (34)$$

where $p=0, 1, \ldots, L-1$ $q=0, 1, \ldots, M1+C1+M2-1$ $r=0, 1, \ldots, N1-1$ $s7=0, 1, \ldots, N1 \times L-1$ $t7=0, 1, \ldots, M1+C1+M2-1$ The first controller 45 generates addresses p, q, r of the first memory 41 so as to deliver the information elements G7(s7, t7) of codeword F7(s7) sequentially into the first outer error correction encoder 43. The first outer error correction encoder 43 encodes the entered information element G7(s7, t7), and generates a first outer parity. The parity element generated when the information element G7(s7, t7) of codeword F7(s7) is processed by first outer error correction coding is supposed to be G7p(s7, u7), u7=0, 1, ..., M3-1. At this time, the codeword is (G7(s7,0), G7(s7,1), ..., G7(s7,t7), ..., G7(s7,M1+C1+M2-2), G7(s7,M1+C1+ M2-1), G7P(s7,0), G7p(s7,1), ..., G7p(s7,u7), ..., G7p(s7,M3-2), G7p(s7,M3-1))

and the generated outer parity is stored in the first memory 41. At this time, the relation between the parity element G7p(s7, u7) of the outer parity and addresses p, q, r of the first memory 41 is as shown in formula (35).

$p=\lfloor s2/N1 \rfloor$ $q=u2+D1+D2+M1+M2+C1$ $r=s2 \bmod N1$ (35)

where $p=0, 1, \ldots, L-1$ $q=D1+D2+M1+M2+C1, D1+D2+M1+M2+C1+1, \ldots, D1+D2+M1+M2+C1+M3-1$ $r=0, 1, \ldots, N1-1$ $s7=0, 1, \ldots, N1 \times L-1$ $t7=0, 1, \ldots, M3-1$ The controller generates addresses p, q, r of the first memory 41 so that the first outer parity generated in the first outer error correction encoder 43 may be stored in the first memory 41 according to formula (35).

For second outer error correction coding, the second data block stored in the first memory 41 is delivered into the second outer error correction encoder 44.

There are N1×L codewords for second outer error correction coding, and information elements of one codeword are composed of D1 symbols. Herein, the codeword for second outer error correction coding is supposed to be F8(s8), s8=0, 1, ..., N1×L-1. Besides, the information element of codeword F8(s8) is supposed to be G8(s8, t8), t8=0, 1, ..., D1-1. The relation between addresses s8, t8 of information element G8(s8, t8) of codeword F8(s8) and addresses p, q, r of data E2(p, q, r) stored in the memory is shown in formula (36).

$p=\lfloor s8/N1 \rfloor$ $q=t8$ $r=s8 \bmod N1$ (36)

where $p=0, 1, \ldots, L-1$ $q=0, 1, \ldots, D1-1$ $r=0, 1, \ldots, N1-1$ $s8=0, 1, \ldots, N1 \times L-1$ $t8=0, 1, \ldots, D1-1$ The first controller 45 generates addresses p, q, r of the first memory 41 so as to deliver the information elements G8(s8, t8) of codeword F8(s8) sequentially into the second outer error correction encoder 44. The second outer error correction encoder 44 encodes the entered information element G8(s8, t8), and generates a second outer parity. The parity element generated when the information element G8(s8, t8) of codeword F8(s8) is processed by second outer error correction coding is supposed to be G8p(s8, u8), u8=0, 1, ..., D2-1. At this time, the codeword is (G8(s8,0), G8(s8,1), ..., G8(s8,t8), ..., G8(s8,D1-2), G8(s8,D1-1), G8p(s8,0), G8p(s8,1), ..., G8p(s8,u8), ..., G8p(s8,D2-2), G8p(s8,D2-1))

and the generated outer parity is stored in the first memory 41. At this time, the relation between the parity element G8p(s8, u8) of the outer parity and addresses p, q, r of the first memory 41 is as shown in formula (37).

$p=\lfloor s8/N1 \rfloor$ $q=u8+D1$ $r=s8 \bmod N1$ (37)

where $p=0, 1, \ldots, L-1$ $q=D1, D1+1, \ldots, D1+D2-1$ $r=0, 1, \ldots, N1-1$ $s8=0, 1, \ldots, N1 \times L-1$ $t8=0, 1, \ldots, D2-1$ The controller generates addresses p, q, r of the first memory 41 so that the second outer parity generated in the second outer error correction encoder 44 may be stored in the first memory 41 according to formula (37).

After first outer error correction coding and second error correction coding, for inner error correction coding, the data stored in the first memory 41 is delivered into the inner error correction encoder 46.

There are (D1+D2+C1+M1+M2+M3)×L codewords for inner error correction coding, and information elements of one codeword are composed of N1 symbols. Suppose the codeword of inner error correction coding to be F9(s9), s9=0, 1, ..., (D1+D2+C1+M1+M2+M3)×L-1. Also suppose the information element of codeword of F9(s9) to be G9(s9, t9), t9=0, 1, ..., N1-1. The relation between the address of information element G9(s9, t9) of codeword of F9(s9) and addresses p, q, r of data E2(p, q, r) stored in the memory is shown in formula (38).

$p=\lfloor s9/(D1+D2+C1+M1+M2+M3) \rfloor$ $q=s9 \bmod (D1+D2+C1+M1+M2+M3)$ $r=t9$ (38)

where $p = 0, 1, \ldots, L-1$ $q = 0, 1, \ldots, D1+D2+C1+M1+M2+M3-1$ $r = 0, 1, \ldots, N1-1$ $s9 = 0, 1, \ldots, (D1+D2+C1+M1+M2+M3) \times L-1$ $t9 = 0, 1, \ldots, N1-1$ The first controller 45 generates addresses p, q, r of the first memory 41 so as to deliver the information elements G9(s9, t9) of codeword F9(s9) into the inner error correction encoder 46 in the sequence of S9=0, 1, . . . , (D1+D2+C1+M1+M2+M3)×L−1. The inner error correction encoder 46 encodes the entered codeword, and generates inner parities. The parity element generated by inner error correction coding of codeword F9(s9) is supposed to be G9p(s9, u9), u9=0, 1, . . . , N2−1. At this time, the codeword is (G9(s9,0), G9(s9,1), . . . , G9(s9,t9), . . . , G9(s9,N1−2), G9(s9,N1−1), G9p(s9,0), G9p(s9,1), . . . , G9p(s9,u9), . . . , G9p(s9,N2−2), G9p(s9,N2−1))

and the inner error correction encoder 46 delivers the entered information element and parity element of one codeword into the recording circuit 7 in the sequence of codewords.

In the recording circuit 7, the entered data is provided with sync pattern which is a sign in reproducing, and an ID which is a position address on the track, in codeword unit for inner error correction coding, to obtain a sync block, which is modulated and sent into the recording head 8. The recording head records the modulated signal on a magnetic tape 9. At this time, the recording circuit 7 gathers (D1+D2+C1+M1+M2+M3) sync blocks composed of codewords F9(s9) for inner error correction coding, and modulates as one track. The ID is composed of at least the track number to be recorded, and the sync block in the track.

When reproducing, a reproducing head 10 reproduces data from the magnetic tape 9, and sends out to a reproducing circuit 11. In the reproducing circuit 11, the entered reproduction signal is demodulated, and reorganized into a sync block on the basis of the sync pattern, and the ID and code word encoded by inner error correction are obtained, and are sent into an inner error correction decoder 47.

The inner error correction decoder 47 decodes the reproduced codeword. The elements of the codeword after inner error correction coding are supposed to be J9(y9), y9=0, 1, . . . , N1+N2−1 sequentially from the beginning. Herein, elements of J9(y9), y9=0, 1, . . . , N1−1 are information elements of codeword for inner error correction coding, and elements of J9(y9), y9=N1, N1+1, . . . , N1+N2−1 are parity elements of codeword for inner error correction coding. The inner error correction decoder 47 delivers the decoded information elements J9'(y9'), y9'=0, 1, . . . , N1−1 into a second memory 48. At this time, the entered ID is delivered into a second controller 53.

The second memory 48 has at least a capacity in the size of (D1+D2+C1+M1+M2+M3)×N1×L symbols, and its addresses are expressed by p', q', r', and the data expressed in addresses p', q', r' are supposed to be E2' (p', q', r').

The second controller 53 generates addresses of the second memory 48 on the basis of the entered ID, and stores the output of the inner error correction decoder 47 into the second memory 48. Supposing the track number contained in the ID to be v, the sync block number in the track to be w, and the outer of the inner error correction decoder 47 to be J9'(y9'), y9'=0, 1, . . . , N1−1, according to formula (39) below, addresses p', q', r' of the second memory 48 are generated, and the output of the inner error correction decoder 47 is stored in the second memory 48. The relation between address y9' of the element J9'(y9') after inner error correction decoding, addresses v, w of ID position, and addresses p', q', r' of the second memory 48 is shown in formula (38).

$p' = v$ $q' = w$ $r' = y9'$ \hfill (39)

where $p = 0, 1, \ldots, L-1$ $q = 0, 1, \ldots, D1+D2+C1+M1+M2+M3-1$ $r = 0, 1, \ldots, N1-1$ $v = 0, 1, \ldots, L-1$ $w = 0, 1, \ldots, D1+D2+C1+M1+M2+M3-1$ $y9' = 0, 1, \ldots, N1-1$ After storing the information elements by inner error correction decoding of L tracks into the second memory 48, for first outer error correction decoding, the information elements stored in the second memory 48 are delivered into a first outer error correction decoder 50.

There are N1×L codewords for first outer error correction decoding per data block, and elements of one codeword are composed of M1+M2+M3+C1 symbols. Herein, the codewords of the first outer error decoding are supposed to be H7(x7), x7=0, 1, . . . , N1×L−1, and the elements of H7(x7) to he J7(x7, y7), y7=0, 1, . . . , M1+M2+M3+C1−1. The relation between addresses x7, y7 of the element J7(x7, y7), and addresses p', q', r' of data E2'(p', q'. r') stored in the second memory 48 is expressed in formula (40).

$p' = \lfloor x7/N1 \rfloor$ $q' = y7+D1+D2$ $r' = x7 \bmod N1$ \hfill (40)

where $p' = 0, 1, \ldots, L-1$ $q' = D1+D2, D1+D2+1, \ldots, D1+D2+M1+M2+M3+C1-1$ $r' = 0, 1, \ldots, N1-1$ $x7 = 0, 1, \ldots, N1 \times L-1$ $y7 = 0, 1, \ldots, M1+M2+M3+C1-1$ The second controller 53 generates addresses p', q', r' of the second memory 48 so as to deliver the elements J7(x7, y7) of codeword H7(x7) into the first outer error correction decoder 50 sequentially. Herein, elements of J7 (x7, y7), y7=0, 1, . . . , M1+M2+C1−1 are information elements of codeword for first outer error coding, and elements of J7(x7, y7), y7=M1+M2+C1, M1+M2+C1+1, . . . , M1+M2+M3+C1−1 are parity elements of codeword for first outer error correction coding.

The first outer error coding decoder 50 delivers the information elements by first outer error correction decoding, J7'(x7', y7'), x7=0, 1, . . . , N1×L, y7=0, 1, . . . , M1+M2+C1−1, into the second memory 48. The information elements after first outer error correction coding, J7'(x7', y7'), are stored in the second memory 48. At this time, the relation between address x7', y7' of the information elements by first outer error correction decoding, J7'(x7', y7'), and addresses p', q', r' of the second memory 48 is as shown in formula (41).

$$p'=\lfloor x7'/N1 \rfloor$$

$$q'=y7'+D1+D2$$

$$r'=x7' \bmod N1 \quad (41)$$

where $$p'=0, 1, \ldots, L-1$$

$$q'=D1+D2, D1+D2+1, \ldots, D1+D2+M1+M2+C1-1$$

$$r'=0, 1, \ldots, N1-1$$

$$x7'=0, 1, \ldots, N1 \times L-1$$

$$y7'=0, 1, \ldots, M1+M2+C1-1$$

The second controller 53 generates addresses p', q', r' of the second memory 48 so that the data decoded in the first outer error correction decoder 50 may be stored in the second memory 48 according to formula (41).

After first outer error correction decoding, for second outer error correction decoding, the information elements stored in the second memory 48 are delivered into a second outer error correction decoder 51.

There are N1×L codewords for second outer error correction decoding per data block, and elements of one codeword are composed of (D1+D2) symbols. Herein, the codewords for second outer error correction decoding are supposed to be H8(x8), x8=0, 1, ..., N1×L−1, and the elements of H8(x8) to be J8(x8,y8), y8=0, 1, ..., D1+D2−1. The relation between addresses x8, y8 of element J8(x8, y8) and addresses p', q', r' of data E2'(p', q', r') stored in the second memory 48 is shown in formula (42).

$$p'=\lfloor x8/N1 \rfloor$$

$$q'=y8$$

$$r'=x8 \bmod N1 \quad (42)$$

where $$p'=0, 1, \ldots, L-1$$

$$q'=0, 1, \ldots, D1+D2-1$$

$$r'=0, 1, \ldots, N1-1$$

$$x8=0, 1, \ldots, N1 \times L-1$$

$$y8=0, 1, \ldots, D1+D2-1$$

The second controller 53 generates addresses p', q', r' of the second memory 48 so as to deliver the elements J8(x8, y8) of codeword H8(x8) into the second outer error correction decoder 51 sequentially. Herein, elements of J8(x8, y8), y8=0, 1, ..., D1−1 are information elements of codeword for second outer error coding, and elements of J8(x8, y8), y8=D1, D1+1, ..., D1+D2−1 are parity elements of codeword for second outer error correction coding.

The second outer error coding decoder 51 delivers the information elements by second outer error correction decoding, J8'(x8', y8'), x8=0, 1, ..., N1×L, y8=0, 1, ..., D1−1, into the second memory 48. The information elements after second outer error correction coding, J8'(x8', y8'), are stored in the second memory 48. At this time, the relation between address x8', y8' of the information elements by second outer error correction decoding, J8'(x8', y8'), and addresses p', q', r' of the second memory 48 is as shown in formula (43).

$$p'=\lfloor x8'/N1 \rfloor$$

$$q'=y8'$$

$$r'=x8' \bmod N1 \quad (43)$$

where $$p'=0, 1, \ldots, L-1$$

$$q'=0, 1, \ldots, D1-1$$

$$r'=0, 1, \ldots, N1-1$$

$$x8'=0, 1, \ldots, N1 \times L-1$$

$$y8'-0, 1, \ldots, D1-1$$

The second controller 53 generates addresses p', q', r' of the second memory 48 so that the data decoded in the second outer error correction decoder 51 may be stored in the second memory 48 according to formula (43).

After the information elements undergoing first outer error correction decoding and second outer error correction decoding are stored in the second memory 48, for inter-track error correction decoding, the information elements stored in the second memory 48 are delivered into an inter-track error correction decoder 52.

There are N1×L codewords for inter-track error correction decoding per data block, and elements of one codeword are composed of (D1+M1+M2) symbols. Herein, the codewords for inter-track error correction decoding are supposed to be H6(x6), x6=0, 1, ..., N1×L−1, and the elements of H6(x6) to be J6(x6,y6), y6=0, 1, ..., D1+M1+M2−1. The relation between addresses x6, y6 of element J6(x6, y6) and addresses p', q', r' of data E2'(p', q', r') stored in the second memory 48 is shown in formula (44).

If y6<D1, $$p'=((x6/N1)+(y6 \times d)) \bmod L$$

$$q'=y6$$

$$r'=(x6+y6) \bmod N1 \quad (44)$$

If y6=>D1, $$p'=((x6/N1)+((y6+D2+e) \times d)) \bmod L$$

$$q'=y6+D2+e$$

$$r'=(x6+y6+D2+e) \bmod N1$$

where $$p'=0, 1, \ldots, L-1$$

$$q'=0, 1, \ldots, D1-1, D1+D2+e, D1+D2+e+1, \ldots, D1+D2+M1+M2+e-1$$

$$r'=0, 1, \ldots, N1-1$$

$$x6=0, 1, \ldots, N1 \times L-1$$

$$y6=0, 1, \ldots, D1+M1+M2-1$$

$$d=3$$

The second controller 53 generates address p', q', r' of the second memory 48 so as to deliver the elements J6(x6, y6) of codeword H6(x6) sequentially into the inter-track error correction decoder 53. Herein, the elements of J6(x6, y6), y6=0, 1, D1+M1−1 are information elements of code word for inter-track error correction coding, and elements of J6(x6, y6), y6=D1+M1, D1+M1+1, ..., D1+M1+M2−1 are parity elements of codeword for inter-track error correction coding.

The inter-track error correction decoder 52 delivers the decoded information elements J6'(x6', y6'), x6'=0, 1, ..., N1×L, y6'=0, 1, ..., D1+M1−1 into the second memory 48. The inter-track error correction coded information elements J6'(x6', y6') are stored in the second memory 48. At this time, the relation between addresses x6', y6' of the inter-track error correction decoded information elements J6'(x6', y6'), and addresses p', q', r' of the second memory 48 is shown in formula (45).

If y6'<D1, $$p'=((x6'/N1)+(y6'\times d)) \bmod L$$

$$q'=y6'$$

$$r'=(x6'+y6') \bmod N1 \quad (45)$$

If y6'=>D1, $$p'=((x6'/N1)+((y6'+D2+e)\times d)) \bmod L$$

$$q'=y6'+D2+e$$

$$r'=(x6'+y6'+D2+e) \bmod N1$$

where $$p'=0, 1, \ldots, L-1$$

$$q'=0, 1, \ldots, D1-1, D1+D2+e, D1+D2+e+1, \ldots, D1+D2+M1+e-1$$

$$r'=0, 1, \ldots, N1-1$$

$$x6=0, 1, \ldots, N1\times L-1$$

$$y6=0, 1, \ldots, D1+M1-1$$

$$d=3$$

The second controller 53 generates addresses p', q', r' of the second memory 48 so that the information elements decoded in the inter-track error correction decoder 52 may be stored in the second memory 48 according to formula (45).

Thus reproduced first data block and second data block are subjected to triple error correction decoding, while the reproduced auxiliary data block is subjected to double error correction decoding.

Consequently, the data stored in the second memory 48 is sent out into a deformatter 54. In the deformatter 54, the first data block, second data block, and auxiliary data block are delivered in the sequence of input at the time of recording. Supposing the first data block to be A5'(b5'), b5'=0, 1, ... , M1×N1×L−1 in the sequence of output, the relation between number b5' of output of data A5'(b5') and addresses p', q', r' of data E2'(p', q', r') stored on the second memory 48 is as shown in formula (46).

$$p=|b5'/(M1\times N1)|$$

$$q=(b5' \bmod (M1\times N1))+D1+D2+e$$

$$r=b5' \bmod N1 \quad (46)$$

where $$p=0, 1, \ldots, L-1$$

$$q=D1+D2+e, D1+D2+e+1, \ldots, D1+D2+e+M1-1$$

$$r=0, 1, \ldots, N1-1$$

$$b5'=0, 1, \ldots, M1\times N1\times L-1$$

$$e=2$$

At this time, the second controller 53 generates addresses p', q', r' of the second memory 48 according to number b5' of the first data block to be delivered, and formula (46). Supposing the second data block to be A6'(b6'), b6'=0, 1, . . . , D1×N1×L−1 in the sequence of output, the relation between number b6' for delivering data A6'(b6') and addresses p', q', r' of data E2'(p', q', r') stored in the second memory 48 is as shown in formula (47).

$$p=|b6'/(D1\times N1)|$$

$$q=(b6' \bmod (D1\times N1))$$

$$r=b6' \bmod N1 \quad (47)$$

where $$p=0, 1, \ldots, L-1$$

$$q=0, 1, \ldots, D1-1$$

$$r=0, 1, \ldots, N1-1$$

$$b6'=0, 1, \ldots, D1\times N1\times L-1$$

At this time, the second controller 53 generates addresses p', q', r' of the second memory 48 according to number b6' of the first data block to be delivered, and formula (47). Supposing the auxiliary data block to be A7'(b7'), b7'=0, 1, . . . , C1×N1×L−1 in the sequence of output, the relation between number b7' for delivering data A7'(b7') and addresses p', q', r' of data E2'(p', q', r') stored in the second memory 48 is as shown in formula (48).

$$p=|b7'/(C1\times N1)|$$

$$tq=|b7' \bmod (C1\times N1)|$$

$$q=D1+D2+tq \quad (tq<e)$$

$$=D1+D2+M1+tq \quad (tq>=e)$$

$$r=b7' \bmod N1 \quad (48)$$

where $$p=0, 1, \ldots, L-1$$

$$q=D1+D2, D1+D2+1, \ldots, D1+D2+e-1, D1+D2+M1+e, D1+D2+M1+e+1, \ldots, D1+D2+M1+C1-1$$

$$r=0, 1, \ldots, N1-1$$

$$b7'=0, 1, \ldots, C1\times N1\times L-1$$

At this time, the second controller 53 generates addresses p', q', r' of the second memory 48 according to number b7' of the first data block to be delivered, and formula (48).

The formatter formats and delivers the first data block, second data block, and auxiliary data block.

A configuration of track data at this time is shown in FIG. 9(a). FIG. 9(a) shows a composition of track supposing D1=9, D2=5, M1=126, M2=9, M3=11, C1=3, N1=77, N2=8, and e=2. One track comprises a second data block region 60 composed of 9 (D1) sync blocks, a second outer parity region 61 composed of 6 (D2) sync blocks, a first auxiliary data block region 62 composed of 2 (e) sync blocks, a first data block region 63 composed of 126 (M1) sync blocks, an inter-track parity region 64 composed of 9 (M2) sync blocks, a second auxiliary data block region 65 composed of 1 (C1-e) sync block, and a first outer parity region 66 composed of 11 (M3) sync blocks.

In the second data block region 60 are disposed sync blocks generated by inner error correction coding of the second data block. That is, sync blocks composed of codeword F9(s9) of which remainder of dividing s9 of codeword F9(s9) for inner error correction coding by D1+D2+M1+M2+M3+C1 is 0 to D1−1 are disposed sequentially from the codeword smaller in the remainder by dividing by D1+D2+M1+M2+M3+C1.

In the second the outer parity region 61 are disposed sync blocks generated by second outer error correction coding of the second data block. That is, sync blocks composed of codeword F9(s9) of which remainder of dividing s9 of codeword F9(s9) for inner error correction coding by D1+D2+M1+M2+M3+C1 is D1 to D1+D2−1 are disposed sequentially from the codeword smaller in the remainder by dividing by D1+D2+M1+M2+M3+C1. In the first auxiliary data block region 62 are disposed sync blocks generated by inner error correction coding of part of the auxiliary data block. That is, sync blocks composed of codeword F9(s9) of which remainder of dividing s9 of codeword F9(s9) for inner error correction coding by D1+D2+M1+M2+M3+C1 is D1+D2 to D1+D2+e−1 are disposed sequentially from the codeword smaller in the remainder by dividing by D1+D2+M1+M2+M3+C1.

In the first data block region 63 are disposed sync blocks generated by inner error correction coding of the first data block. That is, sync blocks composed of codeword F9(s9) of which remainder of dividing s9 of codeword F9(s9) for inner error correction coding by D1+D2+M1+M2+M3+C1 is D1+D2+e to D1+D2+e+M1−1 are disposed sequentially from the codeword smaller in the remainder by dividing by D1+D2+M1+M2+M3+C1.

In the inter-track parity region 64 are disposed sync blocks generated by inner error correction coding of the first data block. That is, sync blocks composed of codeword F9(s9) of which remainder of dividing s9 of codeword F9(s9) for inner error correction coding by D1+D2+M1+M2+M3+C1 is D1+D2+M1+e to D1+D2+e+M1+M2−1 are disposed sequentially from the codeword smaller in the remainder by dividing by D1+D2+M1+M2+M3+C1.

In the second auxiliary data block region 65 are disposed sync blocks generated by inner error correction coding of part of the auxiliary data block. That is, sync blocks composed of codeword F9(s9) of which remainder of dividing s9 of codeword F9(s9) for inner error correction coding by D1+D2+M1+M2+M3+C1 is D1+D2+e+M1+M2 to D1+D2+M1+M2+C1−1 are disposed sequentially from the codeword smaller in the remainder by dividing by D1+D2+M1+M2+M3+C1.

In the first outer parity region 66 are disposed sync blocks generated by inner error correction coding of the first outer parity generated by outer error correction coding of the first data block, auxiliary data block and inter-track parity That is, sync blocks composed of codeword F9(s9) of which remainder of dividing s9 of codeword F9(s9) for inner error correction coding by D1+D2+M1+M2+M3+C1 is D1+D2+M1+M2+C1 to D1+D2+M1+M2+M3+C1−1 are disposed sequentially from the codeword smaller in the remainder by dividing by D1+D2+M1+M2+M3+C1.

A configuration of sync block is shown in FIG. 7. The sync blocks are recorded in the sequence of, from the beginning, sync pattern 30, ID 31, information element region 32, and parity element region 33. In the information element region 32, information elements G9(S9, t9) of codeword for inner error correction coding are arranged in the sequence of t3=0, 1, ..., N1−1, and in the parity element region 33, parity elements G9 (s9, u9) of codeword for inner error correction coding are arranged in the sequence of t9=0, 1, ..., N2−1.

In this way, at the time of recording, the input data and auxiliary data are formatted in first data block, second data block and auxiliary data block, first data block and second data block are coded by inter-track error correction to generate inter-track parities, second data block is coded by second outer error correction to generate a second outer parity, first data block, auxiliary data block, inter-track parity are coded by first outer error correction to generate first outer parities, first data block, second data block, auxiliary data block, inter-track parities, first outer parities, and second outer parity are coded by inner error correction, and sync blocks are composed in the unit of codewords for inner error correction coding and recorded in a magnetic tape, and when reproducing, reproduced data are in the unit of sync block, first data block, second data block, auxiliary data blocks, inter-track parities, first outer parities, and second outer parity are decoded by inner error correction, first data block, auxiliary data blocks and inter-track parities are decoded by first outer error correction by using first outer parities, second data block is decoded by second outer error correction by using second outer parity, first data block and second data block are decoded by inter-track error correction by using inter-track parities, first data block and second data block are deformatted and delivered as data, and auxiliary data blocks are deformatted and delivered as auxiliary data.

Thus, input first data block and second data block are processed by triple error correction coding, input auxiliary data are by double error correction coding, and recorded and reproduced, and the reproduced first data block and second data block are decoded by triple error correction, and the reproduced auxiliary data is decoded by double error coding, and therefore if the number of tracks in one data block is short, the codeword for inter-track error correction coding can be extended, which is very effective for curtailing circuits in a data recording and reproducing apparatus.

In this way, the entered data is divided into the first data block and second data block, the entered first data block and second data block are coded by triple error correction, the entered auxiliary data by double error coding, and recorded and reproduced, while the reproduced first data block and second data block are decoded by triple error correction, and the reproduced auxiliary data block by double error coding, so that the outer error correction encoder, inner error correction encoder, outer error correction decoder, and inner error correction decoder can be shared between the digital data recording and reproducing apparatus and household digital VCR, thereby recording and reproducing data at high reliability, and moreover the one unit of error correction is shorter, so that the memory capacity can be curtailed, hence saving cost, which is very effective.

When the data is wrong, adjoining regions are often wrong continuously. By recording the adjacent data in the magnetic tape 9 adjacently in the input sequence, if the reproduced data is wrong at the time of reproduction, the wrong data are locally concentrated, and effects of error can be limited locally, so that the effects may be minimized.

Next is explained the inter-track error correction coding of the entered auxiliary data.

The composition of codeword for inter-track error correction at this time is described. The first data block in the size of M1×N1×L symbols divided in the formatter 40 is supposed to be A5(b5), b5=0, 1, ..., M1×N1×L−1 in the sequence of input. The first memory 41 has at least an address space of (M1+M2+M3+D1+D2)×N1×L, and expressing the addresses as p, q, r, the data stored in the addresses p, q, r are supposed to be E2(p, q, r). Herein, p=0, 1, ..., L−1, q=0, 1, ..., M1+M2+M3+D1+D2−1, and r=0, 1, ..., N1−1.

Herein, the relation between number b5 of the entered data A5(b5) of the first data block and addresses p, q, r of the data E2(p, q, r) stored in the first memory 41 is shown in formula (49).

$p=\lfloor b5/(M1\times N1)\rfloor$ $q=b5 \bmod (M1\times N1)+D1+D2+e$ $r=b5 \bmod N1$  (49)

where $p=0, 1, \ldots, L-1$ $q=D1+D2+e, D1+D2+e+1, \ldots, D1+D2+e+M1-1$ $r=0, 1, \ldots, N1-1$ $b5=0, 1, \ldots, M1\times N1\times L-1$ $e=2$ That is, the entered data A5(b5) is stored in the address indicated in formula (49) in the first memory 41. At this time, the first controller 45 generates addresses p, q, r of the first memory according to the entered data number b5 and formula (49).

The second data block in the size of D1×N1×L symbols divided in the formatter 40 is supposed to be A6(b6), b6=0, 1, ..., D1×N1×L−1 in the sequence of input. The relation between number b6 of the entered data A6(b6) of the second data block and addresses p, q, r of the data E2(p, q, r) stored in the first memory 41 is shown in formula (50).

$p=\lfloor b6/(D1\times N1)\rfloor$ $q=b6 \bmod (D1\times N1)$ $r=b6 \bmod N1$  (50)

where $p=0, 1, \ldots, L-1$ $q=0, 1, \ldots, D1-1$ $r=0, 1, \ldots, N1-1$ $b6=0, 1, \ldots, D1\times N1\times L-1$ That is, the entered data A6(b6) is stored in the address indicated in formula (50) in the first memory 41. At this time, the first controller 45 generates addresses p, q, r of the first memory 41 according to the entered data number b6 and formula (50).

The auxiliary data block in the size of C1×N1×L symbols divided in the formatter 40 is supposed to be A7(b7), b7=0, 1, ..., C1×N1×L−1 in the sequence of input. The relation between number b7 of the entered data A7(b7) of the auxiliary data block and addresses p, q, r of the data E2(p, q, r) stored in the first memory 41 is shown in formula (51).

$p=\lfloor b7/(C1\times N1)\rfloor$ $tq=\lfloor b7 \bmod (C1\times N1)\rfloor$ $q=D1+D2+tq$ ($tq<e$)

$=D1+D2+M1+tq$ ($tq>=e$)

$r=b7 \bmod N1$  (51)

where $p=0, 1, \ldots, L-1$ $q=D1+D2, D1+D2+1, \ldots, D1+D2+e-1, D1+D2+M1+e, D1+D2+M1+e+1, \ldots, D1+D2+M1+C1-1$ $r=0, 1, \ldots, N1-1$ $b7=0, 1, \ldots, C1\times N1\times L-1$ That is, the entered data A7(b7) is stored in the address indicated in formula (51) in the first memory 41. At this time, the first controller 45 generates addresses p, q, r of the first memory 41 according to the entered data number b7 and formula (51).

For inter-track error correction, the data stored in the first memory 41 is delivered into the inter-track error correction encoder 42. There are N1×L codewords for inter-track error correction coding, and information elements of one codeword are composed of M1+D1+C1 symbols. Suppose the codeword for inter-track error correction coding to be F10(s10), s10=0, 1, ..., N1×L−1. Also suppose the information elements of codeword F10(s10) to be G10(s10, t10), t10=0, 1, ..., M1+D1−1. The relation between addresses s10, t10 of information elements G10(s10, t10) of codeword F10(s10) and addresses p, q, r of data E2(p, q, r) stored in the memory is shown in formula (52).

If t10<D1, $p=((s10/N10)+(t10\times d)) \bmod L$ $q=t10$ $r=(t10+s10) \bmod N1$  (51)

If t10=>D1 and t10<D1+M1+e, $p=((s10/N10)+((t10+D2)\times d)) \bmod L$ $q=t10+D2$ $r=(t10+D2+s10) \bmod N1$ If t10=>D1+M1+e, $p=((s10/N10)+((t10+D2+M2)\times d)) \bmod L$ $q=t10+D2+M2$ $r=(t10+D2+M2+s10) \bmod N1$ where $p=0, 1, \ldots, L-1$ $q=0, 1, \ldots, D1-1, D1+D2, D1+D2+1, \ldots, D1+D2+M1+e-1, D1+D2+M1+M2+e, D1+D2+M1+M2+e+1, \ldots, D1+D2+M1+M2+C1-1$ $r=0, 1, \ldots, N1-1$ $s10=0, 1, \ldots, N1\times L-1$ $t10=0, 1, \ldots, M1+D1+C1-1$ $d=3$ $e=2$ The first controller 45 generates addresses p, q, r of the first memory 41 so as to deliver the information elements G10(s10, t10) into the inter-track error correction encoder 42 sequentially and in the codeword unit. Herein, d is an offset for dispersing the codewords for inter-track error correction among tracks. The inter-track error correction encoder 42 encodes the entered information elements, and generates inter-track parities. The parity element generated by inter-track error correction coding of codeword F6(s6) is supposed to be G10p(s10, u10), u10=0, 1, ..., M2−1. At this time, the codeword for inter-track error correction is (G10(s10,0), G10(s10,1), ..., G10(s10,t10), ..., G10(s10,M1+D1+C1−2), G10(s10,M1+D1+C1−1), G10p(s10,0), G10p(s10,1), ..., G10p(s10,u10), ..., G10p(s10,M2−2), G10p(s10,M2−1))

and the generated inter-track parity is stored in the first memory 41. At this time, the relation between addresses s10, u10 of parity element G10p (s10, u10) and addresses p, q, r of the first memory 41 is as shown in formula (52).

$p=((s10/N1)+((u10+D1+D2+e+M1)\times d)) \bmod L$ $q=u10+D1+D2+e+M1$ $r=(t10+D1+D2+e+M1+s10) \bmod N1$ (52)

where $p=0, 1, \ldots, L-1$ $q=D1+D2+e+M1, D1+D2+e+M1+1, \ldots, D1+D2+e+M1+M2-1$ $r=0, 1, \ldots, N1-1$ $s10=0, 1, \ldots, N1 \times L-1$ $u10=0, 1, \ldots, M2-1$ $e=2$ The controller generates addresses p, q, r of the first memory 41 so as to store the inter-track parity generated in the inter-track error correction encoder 42 into the first memory 41 according to formula (32).

The first outer error correction coding, second outer error correction coding, inner error correction coding, inner error correction decoding, first outer error correction decoding, and second outer error correction decoding are conducted in accordance with formula (34) through formula (43).

After the information elements by first outer error correction decoding and second error correction decoding are stored into the second memory 48, for inter-track error correction decoding, the data stored in the second memory 48 is sent out into the inter-track error correction decoder 52.

There are N1×L codewords for inter-track error correction decoding, and elements of one codeword are composed of (D1+M1+M2+C1) symbols. Herein, codewords for inter-track error correction decoding are supposed to be H10 (x10), x10=0, 1, ..., N1×L−1, and elements of H10(x10) to be J10(x10, y10), y10=0, 1, ..., D1+D2+M1+M2+C1−1. The relation between addresses x10,y10 of element J10(x10, y10) and addresses p', q', r' of element E2'(p', q', r') stored in the second memory 48 is as shown in formula (53).

If y10<D1, $p=((x10/N1)+(y10\times d)) \bmod L$ $q=y10$ $r=(y10+x1) \bmod N1$ (53)

If y10=>D1 and y10<D1+M1+e, $p=((x10/N1)+((y10+D2)\times d)) \bmod L$ $q=y10+D2$ $r=(y10+D2+x10) \bmod N1$ If y10=>D1+M1+e and y10<D1+M1+C1, $p=((x10/N1)+((y10+D2+M2)\times d)) \bmod L$ $q=y10+D2+M2$ $r=(y10+D2+M2+x10) \bmod N1$ If y10=>D1+M1+C1, $p=((x10/N1)+((y10+D2-e)\times d)) \bmod L$ $q=y10+D2-e$ $r=(y10+D2-e+x10) \bmod N1$ where $p=0, 1, \ldots, L-1$ $q=0, 1, \ldots, D1-1, D1+D2, D1+D2+1, \ldots, D1+D2+M1+M2+C1-1$ $r=0, 1, \ldots, N1-1$ $x10=0, 1, \ldots, N1 \times L-1$ $y10=0, 1, \ldots, D1+M1+M2+C1-1$ $d=3$ $e=2$ The second controller 53 generates addresses p', q', r' of the second memory 48 so as to deliver the elements J10(x10, y10) of codeword H10(x10) sequentially into the inter-track error correction decoder 52. Herein, the elements of J10 (x10, y10), y10=0, 1, ..., D1+M1+C1−1 are information elements of codeword for inter-track error correction coding, and elements of J10(x10,y10), y10=D1+M1+C1, D1+M1+C1+1, ..., D1+M1+M2+C1−1 are parity elements for inter-track error correction coding.

The inter-track error correction decoder 52 sends out the decoded information elements J10'(x10', y10'), x10'=0, 1, ..., N1×L, y10'=0, 1, ..., D1+M1+C1−1 into the second memory 48. The information elements J10'(x10', y10') after inter-track error correction coding are stored in the second memory 48. At this time, the relation between addresses x10', y10' of the information elements J10'(x10', y10') after inter-track error correction decoding and addresses p', q', r' of the second memory 48 is as shown in formula (54).

If y10'<D1, $p=((x10'/N1)+(y10'\times d)) \bmod L$ $q=y10'$ $r=(y10'+x10') \bmod N1$ (54)

If y10'=>D1 and y10'<D1+M1+e, $p=((x10'/N1)+((y10'+D2)\times d)) \bmod L$ $q=y10'+D2$ $r=(y10'+D2+x10') \bmod N1$ If $y10' \geq D1+M1+e$ and $y10'<D1+M1+C1$, $p=((x10'/N1)+((y10'+D2+M2)\times d)) \bmod L$ $q=y10'+D2+M2$ $r=(y10'+D2+M2+x10') \bmod N1$ where $p'=0, 1, \ldots, L-1$ $q'=0, 1, \ldots, D1-1, D1+D2, D1+D2+1, \ldots, D1+D2+M1+e-1, D1+D2+M1+M2+e, D1+D2+M1+M2+e+1, \ldots, D1+D2+M1+M2+C1-1$ $r'=0, 1, \ldots, N1-1$ $x10'=0, 1, \ldots, N1 \times L-1$ $y10'=0, 1, \ldots, D1+M1+C1-1$ $d=3$ The second controller 53 generates addresses p', q', r' of the second memory 48 so as to store the information elements decoded by the inter-track error correction decoder 52 into the second memory 48 according to formula (54).

Thus reproduced first data block, second data block, and auxiliary data block are processed by triple error correction decoding.

The data stored in the second memory 48 is put out into a deformatter 54. In the deformatter 54, the first data block, second data block, and auxiliary data block are delivered in the sequence of input. Supposing the first data block to be A5'(b5'), b5'=0, 1, . . . , $M1 \times N1 \times L-1$ in the sequence of output, the relation between number b5' for output of data A5'(b5') and addresses p', q', r' of data E2'(p', q', r') stored in the second memory 48 is shown in formula (55).

$p=\lfloor b5'/(M1 \times N1) \rfloor$ $q=(b5' \bmod (M1 \times N1))+D1+D2+e$ $r=b5' \bmod N1$ (55)

where $p=0, 1, \ldots, L-1$ $q=D1+D2+e, D1+D2+e+1, \ldots, D1+D2+e+M1-1$ $r=0, 1, \ldots, N1-1$ $b5'=0, 1, \ldots, M1 \times N1 \times L-1$ $e=2$ At this time, the second controller 53 generates addresses p', q', r' of the second memory 48 according to number b5' of the first data block to be delivered and formula (55). Supposing the second data block to be A6'(b6'), b6'=0, 1, . . . , $D1 \times N1 \times L-1$ in the sequence of output, the relation between number b6' for output of data A6'(b6') and addresses p', q', r' of the data E2'(p', q', r') stored in the second memory 48 is as shown in formula (56).

$p=\lfloor b6'/(D1 \times N1) \rfloor$ $q=b6' \bmod (D1 \times N1)$ $r=b6' \bmod N1$ (56)

where $p=0, 1, \ldots, L-1$ $q=0, 1, \ldots, D1-1$ $r=0, 1, \ldots, N1-1$ $b6'=0, 1, \ldots, D1 \times N1 \times L-1$ At this time, the second controller 53 generates addresses p', q', r' of the second memory 48 according to number b6' of the first data block to be delivered and formula (56). Supposing the auxiliary data block to be A7'(b7'), b7'=0, 1, . . . , $C1 \times N1 \times L-1$ in the sequence of output, the relation between number b7' for output of data A7'(b7') and addresses p', q', r' of the data E2'(p', q', r') stored in the second memory 48 is as shown in formula (57).

$p=\lfloor b7'/(C1 \times N1) \rfloor$ $tq=\lfloor b7' \bmod (C1 \times N1) \rfloor$ $q=D1+D2+tq$ $(tq<e)$ $=D1+D2+M1+tq$ $(tq \geq e)$ $r=b7' \bmod N1$ (57)

where $p=0, 1, \ldots, L-1$ $q=D1+D2, D1+D2+1, \ldots, D1+D2+e-1, D1+D2+M1+e, D1+D2+M1+e+1, \ldots, D1+D2+M1+C1-1$ $r=0, 1, \ldots, N1-1$ $b7'=0, 1, \ldots, C1 \times N1 \times L-1$ At this time, the second controller 53 generates addresses p', q', r' of the second memory 48 according to number b7' of the first data block to be delivered and formula (57).

Now the deformatter deformats the first data block, second data block, and auxiliary data block, and sends out data and auxiliary data.

In this way, the entered data and auxiliary data are coded by triple error correction, recorded, reproduced, and decoded by triple error correction coding, and therefore if the number of tracks for recording one block is short, the codeword for inter-track error correction coding can be extended, so that it is very effective for curtailing the circuits in the data recording and reproducing apparatus.

In the embodiment, as the ID, the sync block number in the track was recorded, but, instead, it may be any specific number that can identify the inter-track error correction coding and outer error correction coding.

What is claimed is:

1. A digital data recording method for recording input data composed of a sequence of data words each being composed of a plurality of symbols onto a plurality of continuous tracks on a recording medium, comprising the steps of:

forming from the sequence of data words of the input data a data block which is composed of a plurality of data groups each being composed of a plurality of data words;

performing an inter-track error correction coding by forming a plurality of first information elements each being composed of a plurality of symbols collected from a plurality of data words selected from different data groups among said plurality of data groups and subjecting each of the first information elements to an error correction coding to obtain a plurality of first parity words for the plurality of first information elements;

performing an outer error correction coding for each of the plurality of data groups by forming a plurality of second information elements each being composed of a plurality of symbols collected from the plurality of data words and the plurality of first parity code words in each of the plurality of data groups and subjecting the plurality of second information elements to an error correction coding to obtain a plurality of second parity code words;

performing an inner error correction coding by subjecting each of the plurality of data words, each of the plurality of first parity code words and each of the plurality of second parity code words to an error correction coding to obtain a plurality of third parity code words; and recording the data block and the plurality of first through third parity code words on a predetermined number of continuous tracks on the recording medium such that each data group of the plurality of data groups with associated said third parity code words is recorded in a first predetermined recording area of a corresponding one track of the predetermined number of continuous tracks and such that the plurality of first parity code words with associated said third parity code words are distributed to a second predetermined recording area of each of the predetermined number of continuous tracks.

2. A method according to claim 1, wherein each of the data words and the first and second parity code words with an associated third parity code word has a sync pattern and a sync block number added thereto to form a sync block, and the data words and the parity code words are recorded on the tracks in the form of sync blocks each having the sync pattern and the sync block number.

3. A method according to claim 1, wherein each of the symbols forming each of the first information elements is derived from a data word which is different from the data words from which the remaining symbols of said each first information elements are derived.

4. A method according to claim 1, wherein, supposing that symbols in each of the data words are provided with sequential symbol numbers within each of the data marks, each of symbols forming each of the first information elements has a different symbol number from the remaining symbols in said each first information element.

5. A method according to claim 1, wherein symbols forming each of the first information elements are collected from data words which are to be recorded at positions which are substantially uniformly dispersed within an area on the recording medium in which the predetermined number of continuous tracks are formed.

6. A digital data recording apparatus for recording input data composed of a sequence of data words each being composed of a plurality of symbols onto a plurality of continuous tracks on a recording medium, comprising:

a data formatting means for forming from the sequence of data words of the input data a data block which is composed of a plurality of data groups each being composed of a plurality of data words;

a first error correction coding means for performing an inter-track error correction coding by forming a plurality of first information elements each being composed of a plurality of symbols collected from a plurality of data words selected from different data groups among said plurality of data groups and subjecting each of the first information elements to an error correction encoding to obtain a plurality of first parity code words for the plurality of first information elements;

a second error correction coding means for performing an outer error correction coding for each of the plurality of data groups by forming a plurality of second information elements each being composed of a plurality of symbols collected from the plurality of data words and the plurality of first parity code words in each of the plurality of data word units and subjecting the plurality of second information elements to an error correction coding to obtain a plurality of second parity code words;

a third error correction coding means for performing an inner error correction coding by subjecting each of the plurality of data words in the data block, each of the plurality of first parity code words and each of the plurality of second parity code words to an error correction coding to obtain a plurality of third parity code words; and recording means for adding a sync pattern and a sync block number to each of the data words, the first parity code words and the second parity code words with the associated third parity code words to form data sync blocks corresponding to the data words, first parity sync blocks corresponding to the first parity code words and second parity sync blocks corresponding to the second parity code words, and for recording the data word sync blocks, first parity sync blocks and second parity sync blocks derived from the data block on a predetermined number of continuous tracks on the recording medium such that the data word sync blocks in each data word unit of the plurality of data word units are recorded in a first predetermined recording area of a corresponding one track of the predetermined number of continuous tracks and that the first parity sync blocks are distributed to a second predetermined recording area of each of the predetermined number of continuous tracks.

7. An apparatus according to claim 6, wherein each of the symbols forming each of the first information elements is derived from a data word which is different from the data words from which the remaining symbols of said each first information elements are derived.

8. An apparatus according to claim 6, wherein, supposing that symbols in each of the data words are provided with sequential symbol numbers within the data words, each of symbols forming each of the first information elements has a different symbol number from the remaining symbols in said each first information element.

9. An apparatus according to claim 6, wherein symbols forming each of the first information element are collected from data words which are to be recorded at positions which are substantially uniformly dispersed within an area on the recording medium in which the predetermined number of continuous tracks are formed.

10. A method according to claim 1, wherein said recording step records the data block and the plurality of first through third parity code words on the predetermined number of continuous tracks on the recording medium such that the plurality of second parity code words with associated said third parity code words are distributed to a third predetermined recording area of each of the predetermined number of continuous tracks.

* * * * *